US010298790B2

(12) United States Patent
Maeda

(10) Patent No.: US 10,298,790 B2
(45) Date of Patent: May 21, 2019

(54) IMAGE-FORMING APPARATUS, SYSTEM, INFORMATION PROCESSING METHOD AND STORAGE MEDIUM FOR CAUSING AN OPERATION SCREEN TO BE DISPLAYED BASED ON DISPLAY LANGUAGE INFORMATION

(71) Applicant: CANON KABUSHIKI KAISHA, Tokyo (JP)

(72) Inventor: Ryo Maeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/645,249

(22) Filed: Mar. 11, 2015

(65) Prior Publication Data

US 2015/0264206 A1 Sep. 17, 2015

(30) Foreign Application Priority Data

Mar. 14, 2014 (JP) ................................ 2014-051875

(51) Int. Cl.
*H04N 1/44* (2006.01)
*H04N 1/00* (2006.01)

(52) U.S. Cl.
CPC ..... *H04N 1/00509* (2013.01); *H04N 1/00503* (2013.01); *H04N 1/00506* (2013.01); *H04N 1/4433* (2013.01)

(58) Field of Classification Search
CPC ...... G06F 3/0482; G06F 3/0481; G06F 3/048; G06F 3/0484; G06F 21/31; G06F 9/4448;
(Continued)

(56) References Cited

U.S. PATENT DOCUMENTS

| 5,206,687 | A | 4/1993 | Suzuki et al. |
| 7,978,837 | B2 * | 7/2011 | Kim ........................ H04L 63/08 379/201.01 |

(Continued)

FOREIGN PATENT DOCUMENTS

| CN | 101916158 A | 12/2010 |
| CN | 102025860 A | 4/2011 |

(Continued)

OTHER PUBLICATIONS

Windows 7 Annoyances. Author: David A. Karp. Release Date: May 2010. Logon and Profile Options.. (Year: 2010).*

*Primary Examiner* — Chad Dickerson
(74) *Attorney, Agent, or Firm* — Canon U.S.A., Inc. IP Division

(57) ABSTRACT

An image-forming apparatus includes a first display control unit configured to control so as to change an authentication state from a not-log-in state to a log-in state when a log-in request is received and if a authentication of a user succeeds and display an operation screen on an operation unit of the image-forming apparatus based on personal setting information associated with user-identification information by which the user is identifiable, and a second display control unit configured to control so as to change the authentication state from the log-in state to the not-log-in state when a log-out request is received and displays a screen which prompts input of user information on the operation unit based on shared setting information that is shared by a plurality of users.

17 Claims, 23 Drawing Sheets

(58) Field of Classification Search
CPC .. G06F 3/121; G06F 9/4443; G06F 17/30289;
G06F 3/1285; H04L 67/306; H04L
63/102; H04N 21/472; H04N 21/485;
H04N 21/4852; H04N 21/4854; H04N
21/4856; H04N 21/4858; H04N 1/00509;
H04N 1/00514; H04N 1/00511; H04N
1/00517; H04N 1/00405; H04N 1/00474;
H04N 1/0097; H04N 1/00498; H04N
1/00501; H04N 1/00503; H04N 1/00506;
H04N 2201/3276; H04N 1/00244; H04N
1/0035; H04N 1/00962; H04N 1/4433
USPC ............... 358/1.11–1.18; 715/750; 707/632;
713/182; 726/1–21, 26–33
See application file for complete search history.

(56) References Cited

U.S. PATENT DOCUMENTS

| | | | | |
|---|---|---|---|---|
| 8,976,390 | B2* | 3/2015 | Yasukawa | H04N 1/00408 |
| | | | | 358/1.1 |
| 9,374,489 | B2* | 6/2016 | Ishii | H04N 1/0097 |
| 9,671,990 | B2* | 6/2017 | Takenaka | G06F 3/1285 |
| 2007/0198845 | A1* | 8/2007 | Morikawa | G06F 3/121 |
| | | | | 713/182 |
| 2009/0128844 | A1* | 5/2009 | Kondo | H04N 1/00244 |
| | | | | 358/1.15 |
| 2009/0199109 | A1* | 8/2009 | Doui | G06F 9/451 |
| | | | | 715/750 |
| 2011/0131497 | A1* | 6/2011 | Goran | G06F 3/0481 |
| | | | | 715/723 |
| 2011/0286029 | A1 | 11/2011 | Kadowaki | |
| 2012/0167131 | A1 | 6/2012 | Lee | |
| 2013/0314735 | A1* | 11/2013 | Homma | H04N 1/00244 |
| | | | | 358/1.14 |
| 2014/0006348 | A1* | 1/2014 | Akinyemi | G06F 16/21 |
| | | | | 707/632 |
| 2015/0062605 | A1* | 3/2015 | McKinney | H04N 1/00498 |
| | | | | 358/1.13 |
| 2015/0092235 | A1* | 4/2015 | Ishii | H04N 1/0097 |
| | | | | 358/1.16 |

FOREIGN PATENT DOCUMENTS

| | | | |
|---|---|---|---|
| CN | 103428264 | A | 12/2013 |
| JP | 2004-341813 | A | 12/2004 |
| JP | 2005-259109 | A | 9/2005 |
| JP | 2006087144 | A | 3/2006 |
| JP | 2007267362 | A | 10/2007 |
| JP | 2008-204280 | A | 9/2008 |
| JP | 2009-111578 | A | 5/2009 |
| JP | 2011-059958 | A | 3/2011 |
| JP | 2012043145 | A | 3/2012 |
| JP | 2013-131875 | A | 7/2013 |
| JP | 2013-145483 | A | 7/2013 |
| JP | 2013131875 | A * | 7/2013 |
| JP | 2014-192687 | A | 10/2014 |

* cited by examiner

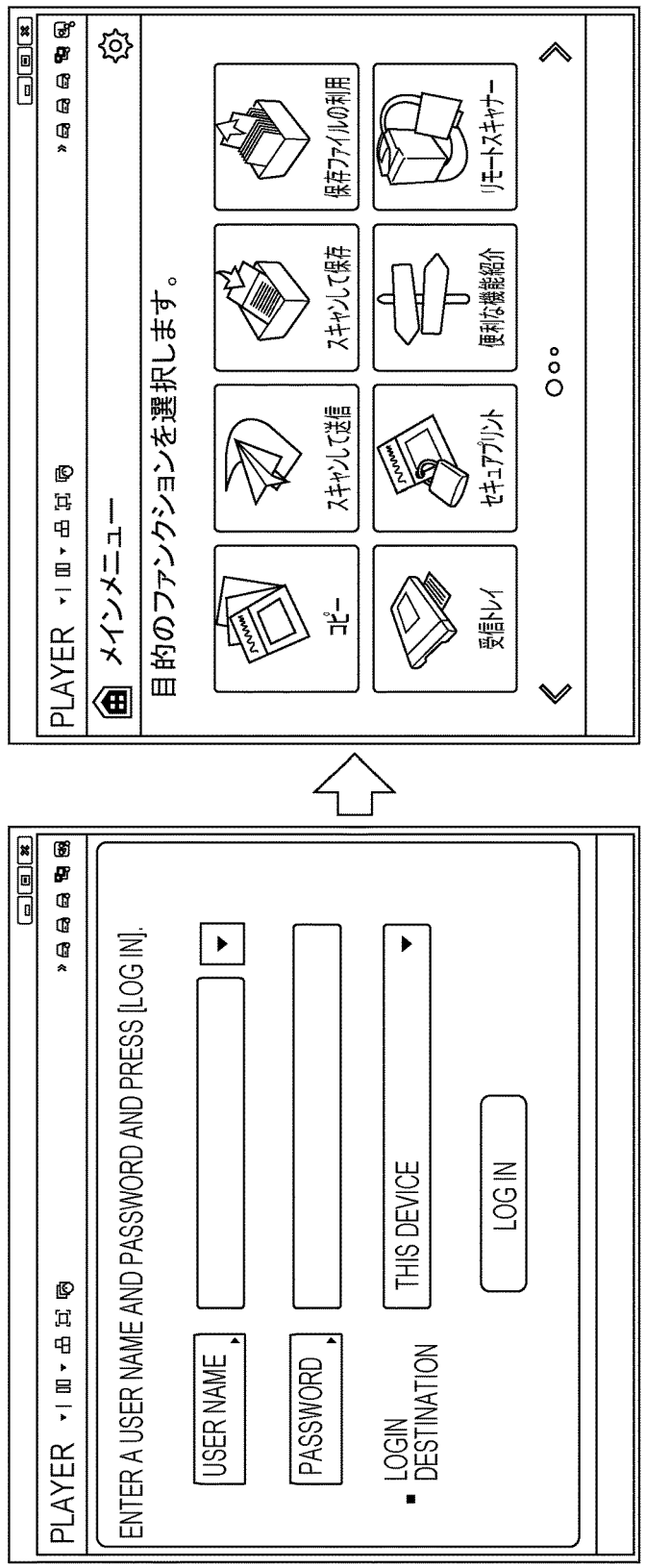

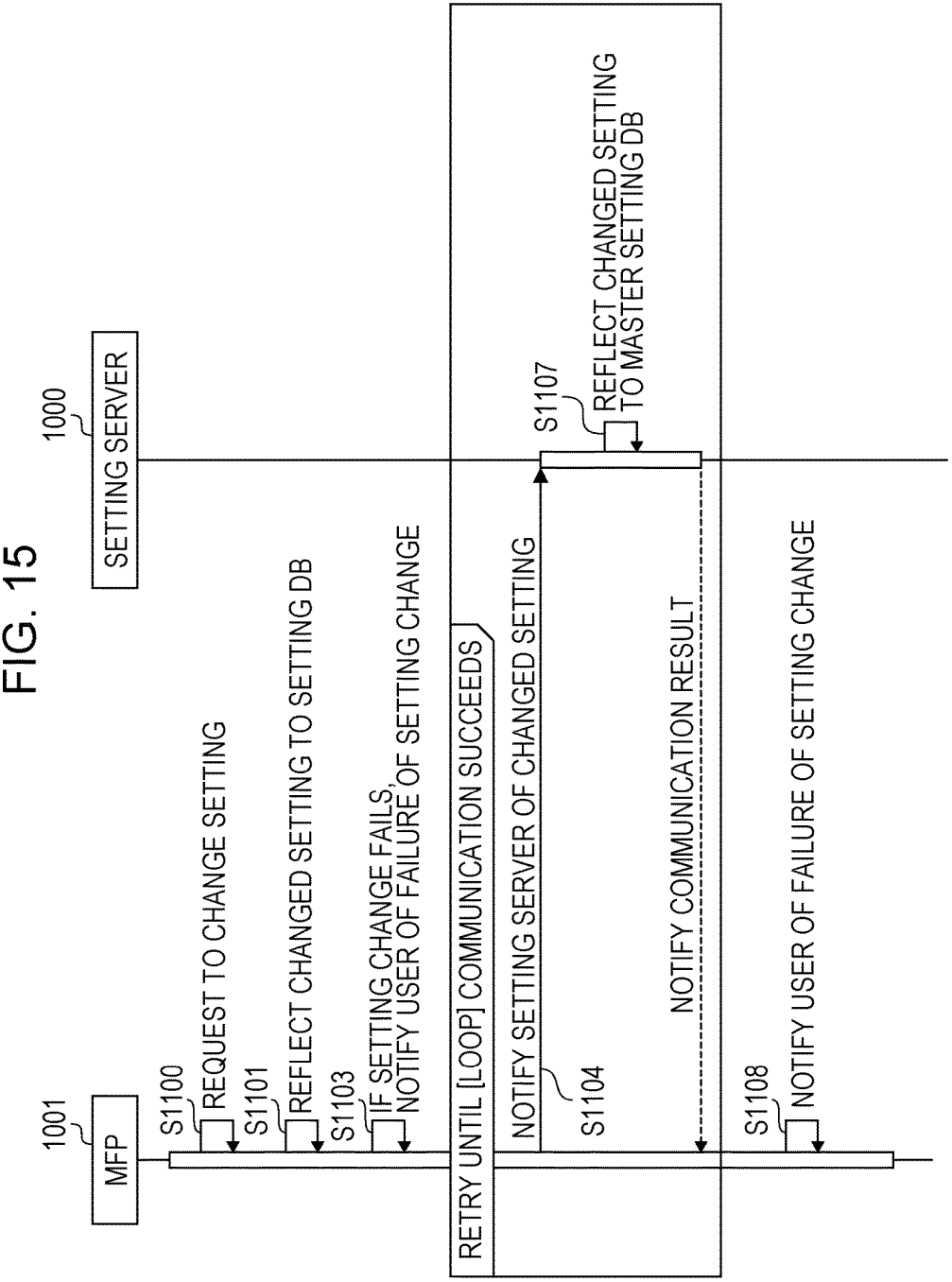

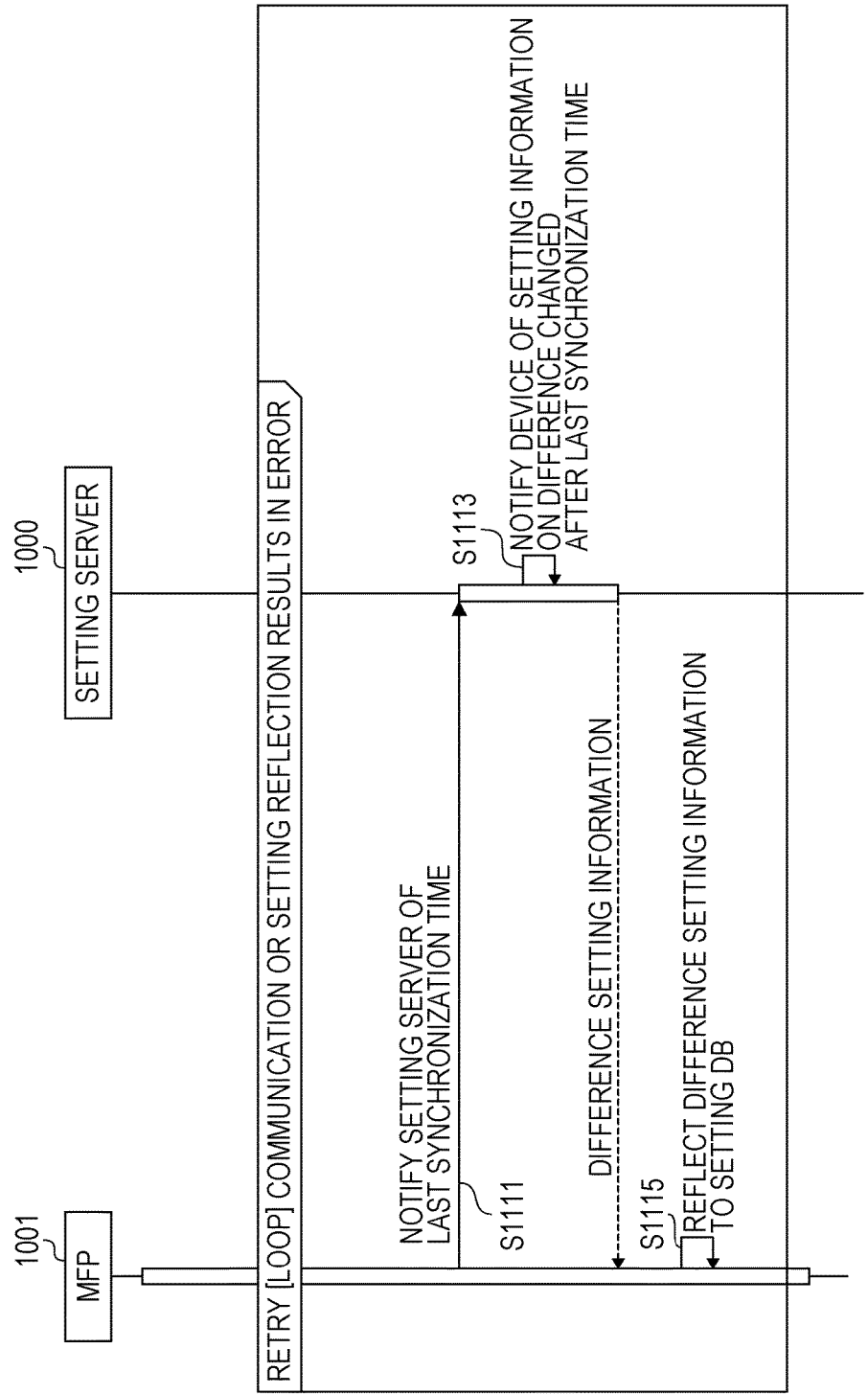

IMAGE-FORMING APPARATUS, SYSTEM, INFORMATION PROCESSING METHOD AND STORAGE MEDIUM FOR CAUSING AN OPERATION SCREEN TO BE DISPLAYED BASED ON DISPLAY LANGUAGE INFORMATION

BACKGROUND OF THE INVENTION

Field of the Invention

The present invention relates to an image-forming apparatus, a system, an information processing method and a program.

Description of the Related Art

In recent years, an image-forming apparatus has various functions, and a user may be required to perform more complicated operations. In general, because an image-forming apparatus is often shared by a plurality of users, an auto-clear function is available which clears set values automatically after a lapse of a predetermined time period from a time when a setting is changed so that a next user may be prevented from using the image-forming apparatus without noticing the setting change. In such a usage, a user may be required to select a desired setting screen from an initial menu provided by the image-forming apparatus as occasion demands. This may repeatedly require a user to define settings even though fixed values may be set normally by individual users. For example, "Japanese" is set as a display language in an image-forming apparatus. A user who requests to utilize "English" as display language may perform operations including first changing the display language setting from "Japanese" to "English", utilizing a desired function, and finally changing the display language setting from "English" to "Japanese".

In order to solve the problem, a customize function has been designed which allows a user to arbitrarily define an initial set value. Such a customize function allows a user to define a personal set value to change the initial value or behavior in accordance with a system personal set value.

Japanese Patent No. 4182099 discloses a technology in the past. According to Japanese Patent No. 4182099, personal setting information of an authenticated user is received from a personalize server, and if the personal setting information contains transmission source information, the source information may be attached to an image to be transmitted.

SUMMARY OF THE INVENTION

The present invention allows automatic change to a user's personal set value and automatic change to a shared set value at end of use for further improvement of user's convenience.

An image-forming apparatus according to an aspect of the present invention includes a first display control unit configured to control so as to change an authentication state from a not-log-in state to a log-in state when a log-in request is received and if a authentication of a user succeeds and display an operation screen on an operation unit of the image-forming apparatus based on personal setting information associated with user-identification information by which the user is identifiable, and a second display control unit configured to control so as to change the authentication state from the log-in state to the not-log-in state when a log-out request is received and displays a screen which prompts input of user information on the operation unit based on shared setting information that is shared by a plurality of users.

According to the present invention, a technology is provided which allows reflection of a personal set value of a user when the user logs in and reflection of a shared set value when the user logs out.

Further features of the present invention will become apparent from the following description of exemplary embodiments with reference to the attached drawings.

BRIEF DESCRIPTION OF THE DRAWINGS

FIG. 4A is a flowchart illustrating an example of information processing to be performed when a user instructs to log in.

FIGS. 6A and 6B illustrate screen examples.

FIG. 15 illustrates an example of sequence processing to and from a server.

FIG. 16 illustrates an example of sequence processing to and from a server.

DESCRIPTION OF THE EMBODIMENTS

Exemplary embodiments of the present invention will be described with reference to drawings.

First Exemplary Embodiment

Figure 1:
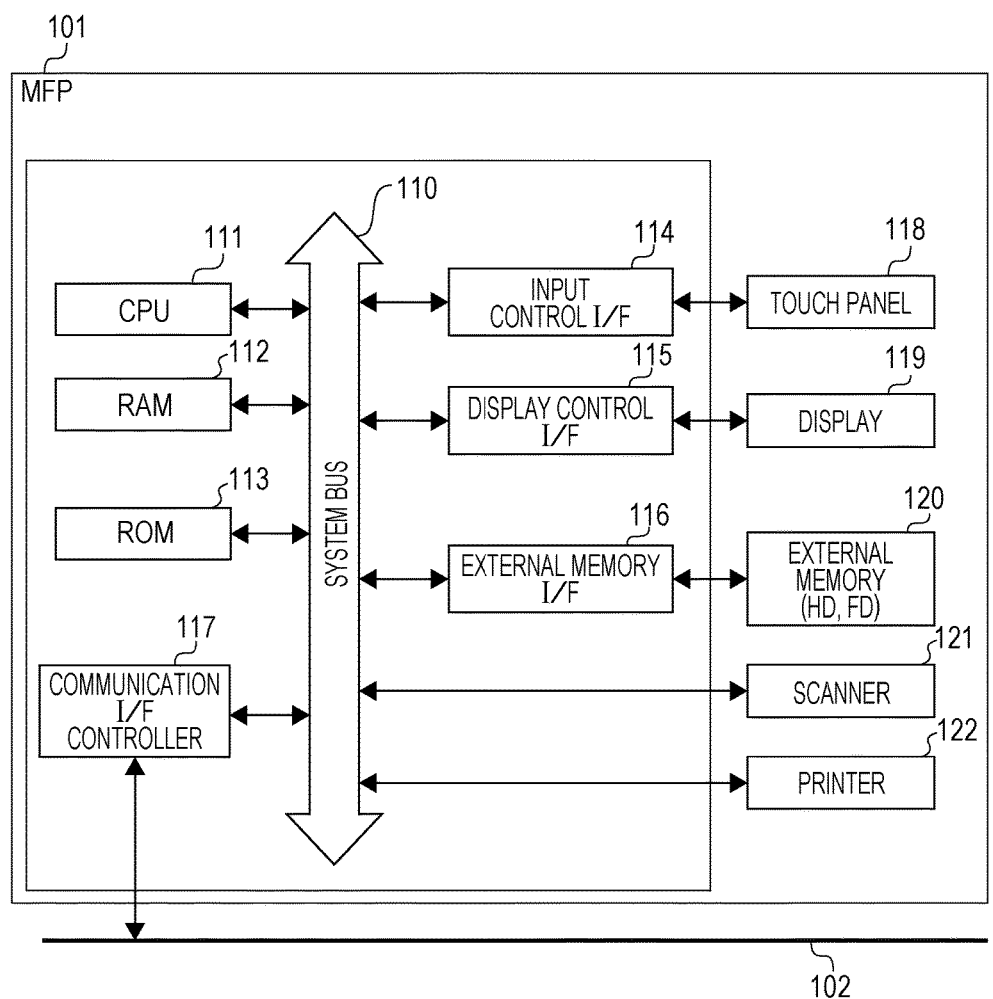
FIG. 1 illustrates an example of a hardware configuration of an MFP.

FIG. 1 illustrates an example of a hardware configuration of an MFP (Multi Function Peripheral) 101. The MFP 101 is an example of an image-forming apparatus. A CPU (central processing unit) 111, a RAM (random access memory) 112, a ROM (read-only memory) 113, an input control I/F (interface) 114, a display control I/F 115, an external memory I/F 116, and a communication I/F controller 117 are connected to a system bus 110. A scanner 121 and a printer 122 are further connected to the system bus 110. These components connected to the system bus 110 are configured to be data-exchangeable via the system bus 110.

The CPU (Central Processing Unit) 111 may control an apparatus and perform calculations and processes on data. The RAM (Random Access Memory) 112 is a volatile memory and is usable as a main memory for the CPU 111 and a temporarily storage area such for a work area. The ROM (Read Only Memory) 113 is a non-volatile memory and may store image data and other data and a program usable by the CPU 111 to operate in predetermined areas. The CPU 111 may use the RAM 112 as a work memory to control components of the MFP 101 in accordance with a program stored in the ROM 113, for example. Such a program usable by the CPU 111 to operate may not always be stored in the ROM 113 and may be stored in the external memory 120. The CPU 111 may execute a process based on a program to implement a configuration and processing based on a flowchart of software in the MFP 101.

The input control I/F 114 may receive a user operation, generate a control signal in accordance with a user operation and supply it to the CPU 111. For example, the input control I/F 114 may receive a user operation through a touch panel 118. The touch panel 118 is an input device configured to output coordinate information in accordance with a position touched on a planarly configured input unit, for example. The touch panel 118 is an example of an operation unit. The CPU 111 controls a component of the MFP 101 in accordance with a program in response to a control signal generated and supplied to the input control I/F 114 based on a user operation onto an input device. Thus, the MFP 101 may be caused to perform an operation based on a user operation. The display control I/F 115 outputs a display signal for displaying an image on a display device 119. For example, the CPU 111 supplies a generated display control signal to the display control I/F 115 in accordance with a program. The display control I/F 115 generates a display signal based on the display control signal and outputs it to the display device 119. For example, the display control I/F 115 causes the display device 119 to display a GUI screen having a GUI (Graphical User Interface) based on a display control signal generated by the CPU 111. The touch panel 118 may be integrated with the display device 119. For example, the touch panel 118 has a light transmittance defined not to interfere with display of the display device 119 and is attached to an upper layer of a display plane of the display device 119. Input coordinates on the touch panel 118 are associated with display coordinates on the display device 119. Thus, the GUI may be configured to appear as if a user is allowed to directly operate a screen displayed on the display device 119.

An external memory 120 such as an HDD (Hard Disk Drive), a flash memory, and a memory card is attachable to the external memory I/F 116. The external memory I/F 116 may read data from the mounted external memory 120 or write data to the external memory 120 under control of the CPU 111. In some configurations, the CPU 111 may use the external memory 120 instead of the ROM 113. The communication I/F controller 117 performs communication with a network such as a LAN, the Internet, a wired network and a wireless network under control of the CPU 111. Various apparatuses such as a PC and other MFP, a printer, and a server are connected to the network 102 communicably with the MFP 101.

The scanner 121 may read a document and generate image data under control of the CPU 111. For example, the CPU 111 causes the scanner 121 to perform scan processing in response to a user instruction input through the input control I/F 114. The scanner 121 reads a document placed on a platen or an ADF (Auto Document Feeder) and digitalizes it to generate image data. The scanner 121 stores the generated image data in the external memory 120 through the external memory I/F 116. The printer 122 performs print processing on image data saved in the external memory 120 under control of the CPU 111. For example, the CPU 111 may cause the printer 122 to perform print processing in response to a user instruction input through the input control I/F 114 or a command instruction input from an external apparatus through the communication I/F controller 117. The printer 122 reads image data from the external memory 120, converts the image data to a printable data format and prints it on a paper document.

Figure 2:
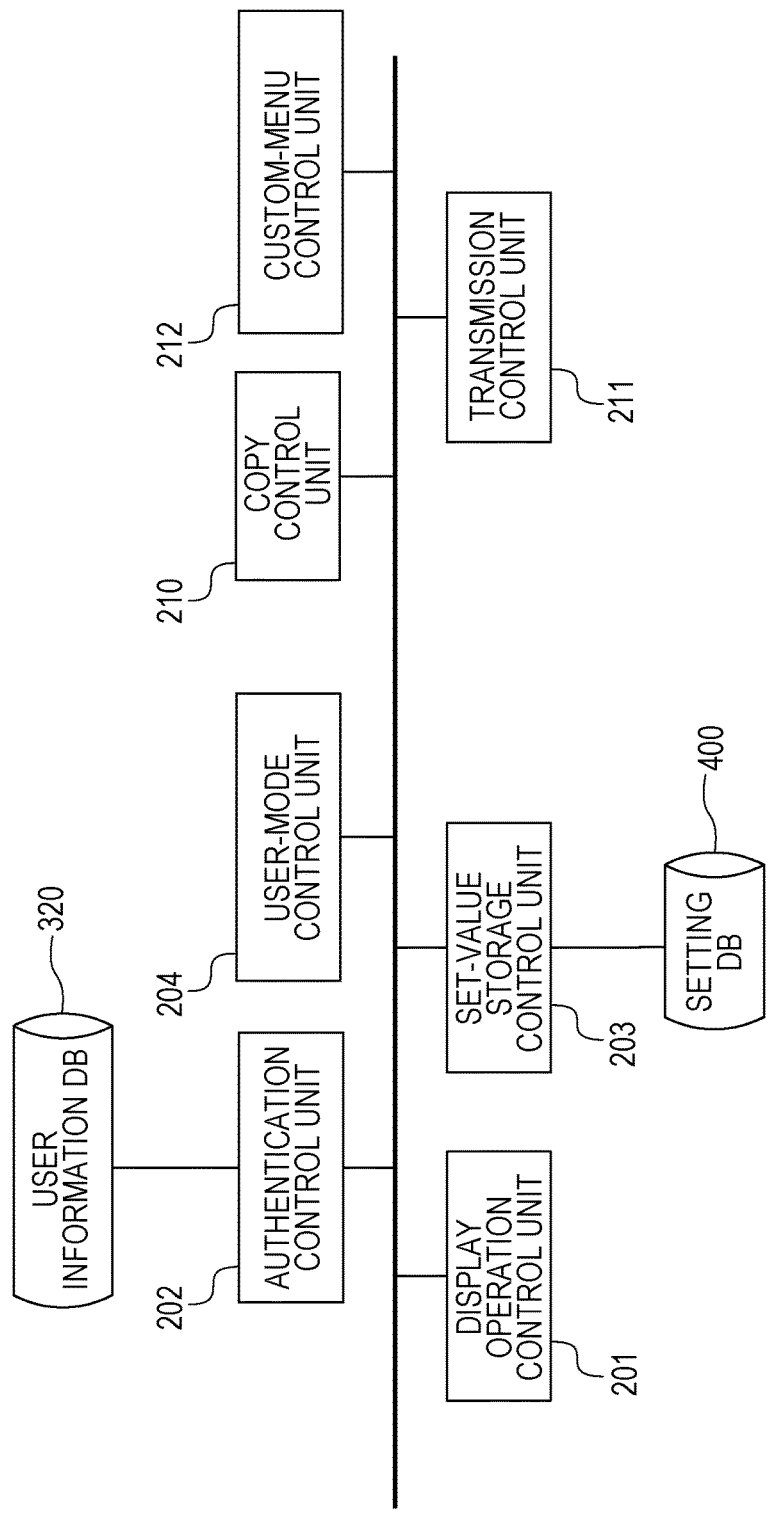
FIG. 2 illustrates an example of a software configuration of an MFP according to a first exemplary embodiment.

A configuration of software in the MFP 101 will be described with reference to FIG. 2. Programs corresponding to control units in FIG. 2 may be stored in the ROM 113 and may be decompressed into the RAM 112 as required such as upon start or use of a function, and be executed by the CPU 111. Thus, the control units illustrated in FIG. 2 may be implemented. The MFP 101 may have control units such as a display operation control unit 201, an authentication control unit 202, a set-value storage control unit 203, and a user-mode control unit 204. The MFP 101 includes one or more functions (hereinafter, each called a Function). A control unit is provided for each of the Functions, and a copy control unit 210, a transmission control unit 211, custom-menu control unit 212 are illustrated (in FIG. 2), for example. It should be understood that a control unit exists for each of Functions involved in processes to be performed by the MFP 101 excluding the Functions illustrated in FIG. 2. Other Functions may include, for example, a secure printing Function having a function only allowing an authenticated user or a user who knows a password associated with a print job submitted from a driver and detained within the MFP 101. Other Function examples may include a box Function having a function for saving image data within the MFP 101, a help Function having a function for displaying a help screen, and a facsimile Function for receiving a facsimile document from a public communication network.

The display operation control unit 201 controls the input control I/F 114 and the display control I/F 115. For example, the display operation control unit 201 may perform processing for displaying on the display device 119 through the display control I/F 115 based on an instruction from a different control unit or acquiring information input by a user on the touch panel 118 through the input control I/F 114. The display operation control unit 201 notifies the acquired information to the corresponding control unit. The authentication control unit 202 performs authentication processing (hereinafter called log-in processing) for identifying a user and determines whether an operator of the MFP 101 is a rightful user of the MFP 101 or not. The authentication control unit 202 controls a database (hereinafter, called a user information DB 320) storing user information on the external memory 120.

Figure 3:
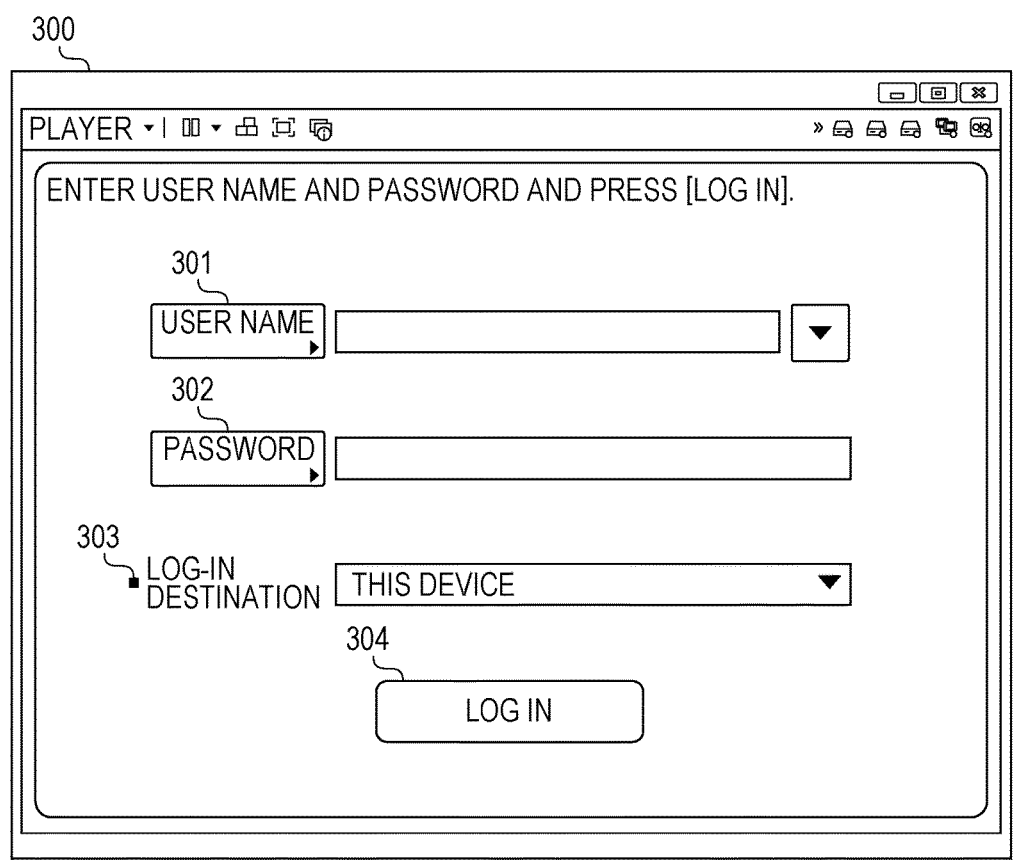
FIG. 3 illustrates an example of a log-in screen.
Figure 4A:
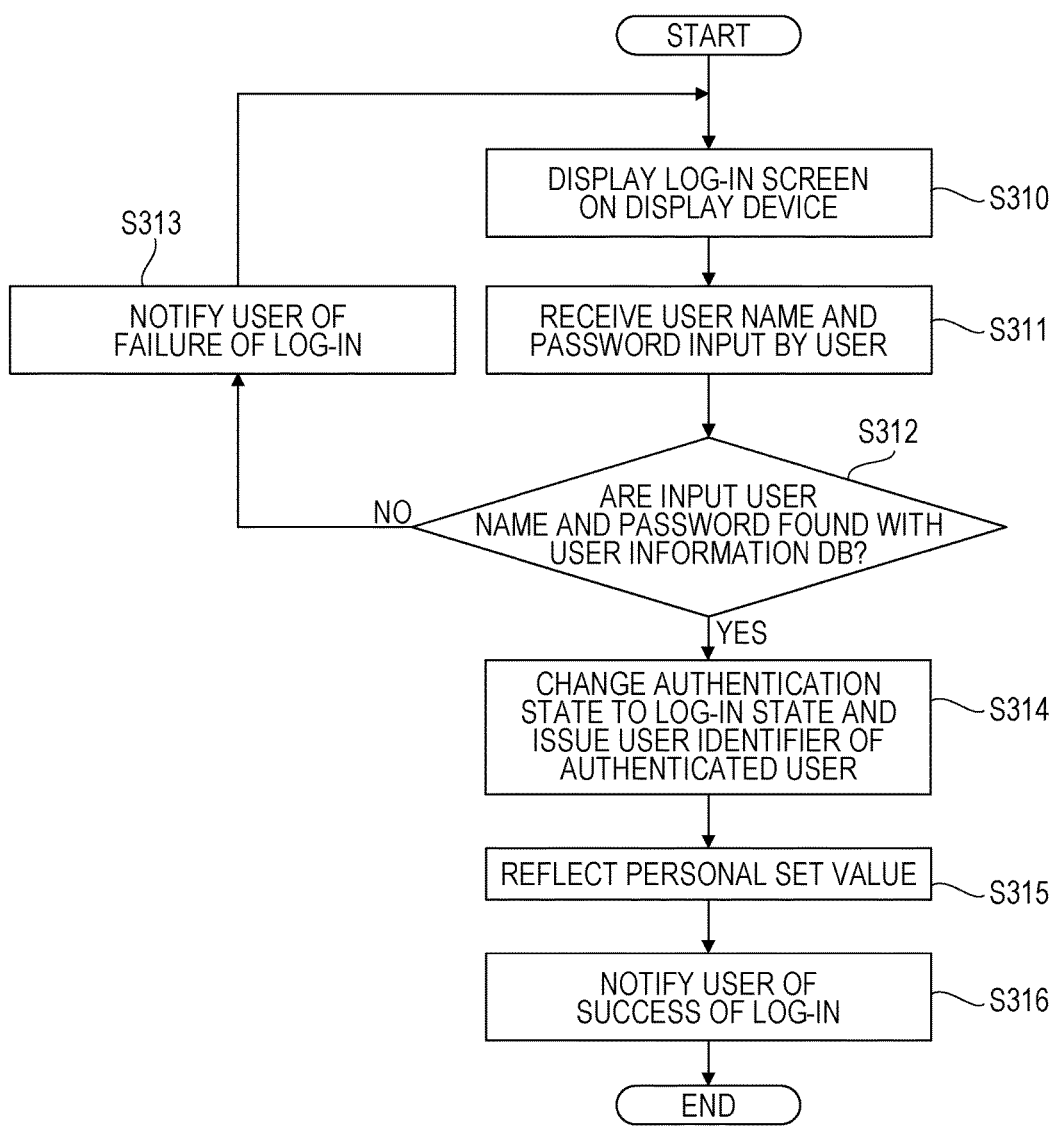

An example of the log-in processing will be described with reference to FIG. 3, FIG. 4A and FIG. 4B. FIG. 3 illustrates an example of a log-in screen 300. In the screen example in FIG. 3, the log-in screen 300 includes a user-name input form 301, a password input form 302, a log-in destination selection button 303, and a log-in button 304. A user may input a user name to the user-name input form 301 and a password to the password input form 302 on the log-in screen 300, selects a log-in destination by using a log-in destination selection button 303 and a selects (or presses) a log-in button 304. Thus, the CPU 111 receives a log-in request. FIG. 4A is a flowchart illustrating an example of information processing to be performed by the authentication control unit 202 in response to a log-in request. As described above, the processing in the authentication control unit 202 may be implemented by execution of a program stored in the ROM 113 by the CPU 111. The authentication control unit 202 issues a request for execution of the following flow to the corresponding control units. The display operation control unit 201 displays a log-in screen 300 on the display device 119 (S310). When a user executes an input process on the touch panel 118, the display operation control unit 201 receives a user name from the username input form 301 and a password from the password input form 302 through the display control I/F 115 (S311). The authentication control unit 202 receives the user name and password input in S311 from the display operation control unit 201 and determines whether the received user name and password and a user name and password within the user information DB 320 are matched or not (S312). If it is determined in S312 that they are not matched, the authentication control unit 202 determines the log-in fails and notifies that the log-in has failed to a user through the display operation control unit 201 (S313). The processing then returns to the log-in reception state in S310. If it is determined in S312 that they are matched, the authentication control unit 202 determines that the authentication succeeds, changes the authentication state from a not-log-in state to a log-in state and issues an identifier for identifying a user uniquely (hereinafter, called a user identifier 321) (S314). The authentication control unit 202 executes a process for reflecting a personal set value through the set-value storage control unit 203 (S315). The detail processing of S315 will be described below. The authentication control unit 202 notifies that the log-in has succeeded to a user through the display operation control unit 201 (S316) and ends the log-in processing.

The authentication method is not limited to the one described above but may be other authentication methods using a non-contact IC card, for example. Furthermore, the MFP 101 may not internally contain the user information DB 320, but, for example, the authentication may be performed by using an external authentication server such as an AD (ActveDirectory). In such a case, the authentication control unit 202 requests an authentication determination to an external authentication server through the communication I/F controller 117. The MFP 101 may further be configured such that the user information DB 320 within the MFP 101 and the external authentication server may be switched. In such a configuration, a user may select for which authentication server the authentication is to be performed by using a log-in destination selection button 303 on a screen as illustrated in FIG. 3, for example.

A change from a log-in state to a not-log-in state will be called a log-out. FIG. 4B is a flowchart illustrating an example of information processing in the authentication control unit 202 to be performed by a user to instruct a log-out. The display operation control unit 201 in response to a log-out request from a user through the touch panel 118 changes the authentication state from the log-in state to the not-log-in state (S330). The authentication control unit 202 performs a process for reflecting a set value in device settings (shared setting) information through the set-value storage control unit 203 (S331). Detail processing of S331 will be described below. The authentication control unit 202 notifies that the log-out has succeeded to a user through the display operation control unit 201 (S332) and ends the log-out processing.

The authentication control unit 202 provides functions for registering a user, deleting the user registration and updating user information. The authentication control unit 202 further provides a group function. The group here refers to a set of a plurality of users. The authentication control unit 202 is capable of registering a plurality of groups. A user is allowed to belong to zero or more groups. The authentication control unit 202 provides functions for registering and deleting a group, updating group information, allowing a user to belong to a group, a allowing a user to withdraw from a group in accordance with a request. The authentication control unit 202 may store a user identifier 321 and an identifier by which a group may be identified uniquely (hereinafter, called a group identifier 322) in the user information DB 320. The authentication control unit 202 stores information describing to which group a user belongs in the user information DB 320.

Figure 5:
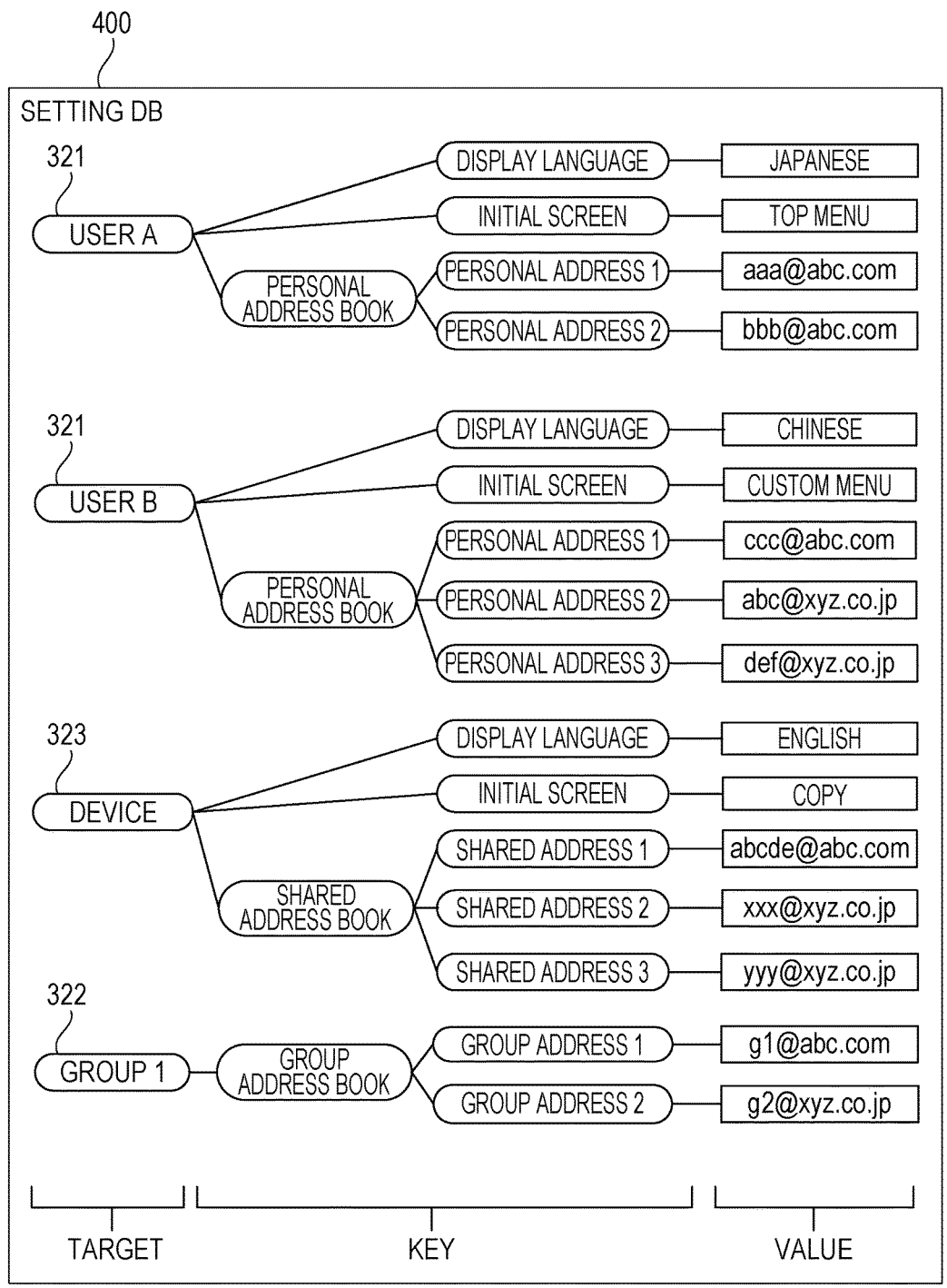
FIG. 5 illustrates an example of a setting DB.

Next, the set-value storage control unit 203 will be described. The set-value storage control unit 203 is a control unit for storage of shared setting information, personal setting information, and group setting information. The shared setting information is setting information to be referred by all users. The personal setting information is setting information to be referred by a corresponding user only. The group setting information is setting information to be referred by a user belonging to a corresponding group. Here, each setting information contains a set of one or two or more setting items and set values set for the setting items. The set-value storage control unit 203 stores setting information in a setting DB 400 on the external memory 120. FIG. 5 illustrates an example of the setting DB 400. The setting DB 400 stores setting information containing a pair of a key by which a setting item is identifiable and a set value. The setting DB 400 is represented by a hierarchical structure. A first hierarchy includes target information. The target information may include information by which shared setting information, personal setting information, or group setting information is identifiable. Furthermore, the target information may include the user identifier 321 which is an identifier by which a user is identifiable for personal settings. The target information may include the group identifier 322 which is an identifier by which a group is identifiable for group settings. In FIG. 5, information by which a shared setting is identifiable, the user identifier 321 and group identifier 322 are referred by "SHARED", "USER NAME", and "GROUP NAME", respectively. A combination of a target and a key may determine a corresponding set value. As illustrated in FIG. 5, the setting DB 400 stores personal setting information in association with user-identification information.

In the example in FIG. 5, a set value for a key "DISPLAY LANGUAGE" under a target "USER A" is "JAPANESE". A set value for a key "DISPLAY LANGUAGE" under a target "USER B" is "CHINESE". In another example, a set value for a key "PERSONAL ADDRESS BOOK—PERSONAL ADDRESS 1" under a target "USER B" is "ccc@abc.com". An equal number of sets of personal setting information is equal to a number of users, and only one set of device setting information (shared setting information) is provided within the MFP 101. In the example in FIG. 5, a set value for a key "SHARED DISPLAY LANGUAGE" is "ENGLISH". A set value for a key "PERSONAL ADDRESS BOOK—PERSONAL ADDRESS 1" under a target "GROUP 1" is "g1@abc.com". It is assumed here that the user A and the user B belong to the group 1, for example. The user A and the user B are allowed to refer the group address 1, and the user C who does not belong thereto may not refer the group address 1.

In setting information in the setting DB 400, some personal setting information and some shared setting information may have an identical key, and some may not. When personal setting information and shared setting information have an identical key, a shared setting value may sometimes be handled as an initial value when no personal set value is registered. In the example in FIG. 5, personal setting information is not registered for a user C. In this case, display language information for the user C is "ENGLISH" which is the shared setting value. When personal setting information and shared setting information do not have an identical key, it is handled as that personal setting information is not registered or zero information set is registered. For example, a key "PERSONAL ADDRESS BOOK" is a key for a target having "PERSONAL" setting information only (the address book will be described below). On the other hand, a key "SHARED ADDRESS BOOK" is a key for a target having "SHARED" setting information. In the example in FIG. 5, the personal address book of the user C has zero information set. Because shared setting information exists, the user C may be allowed to refer a shared address 1, a shared address 2, and a shared address 3 in a shared address book.

The set-value storage control unit 203 reads a personal set value within the setting DB 400 upon log-in and reflects it to the corresponding setting information in the MFP 101. Thus a user may use the MFP 101 customized in accordance with personal setting information registered by the user. The set-value storage control unit 203 reads a shared setting value within the setting DB 400 upon log-out and reflects it to the corresponding setting information in the MFP 101. Thus, a function available in a not-log-in state may be used with a shared set value.

The display language information will be described with reference to FIG. 6A as an example of customizable personal setting information. The set value in the display language information in the shared setting information is "ENGLISH", and the set value for the display language information of the user A is "JAPANESE". Because a shared setting value is valid on a log-in screen 300 in a not-log-in state, the display language is "ENGLISH" as in the left side of FIG. 6A. When a user A executes a log-in process and the authentication succeeds, the set value of the display language information for the user A is reflected in S315 in FIG. 4A. Thus, the display language in the log-in state is "JAPANESE" as illustrated in the right side of FIG. 6A. Upon log-out, because the set value of shared display language information is reflected in S332 in FIG. 4B, the display language on the log-in screen 300 is "ENGLISH".

Figure 6B:
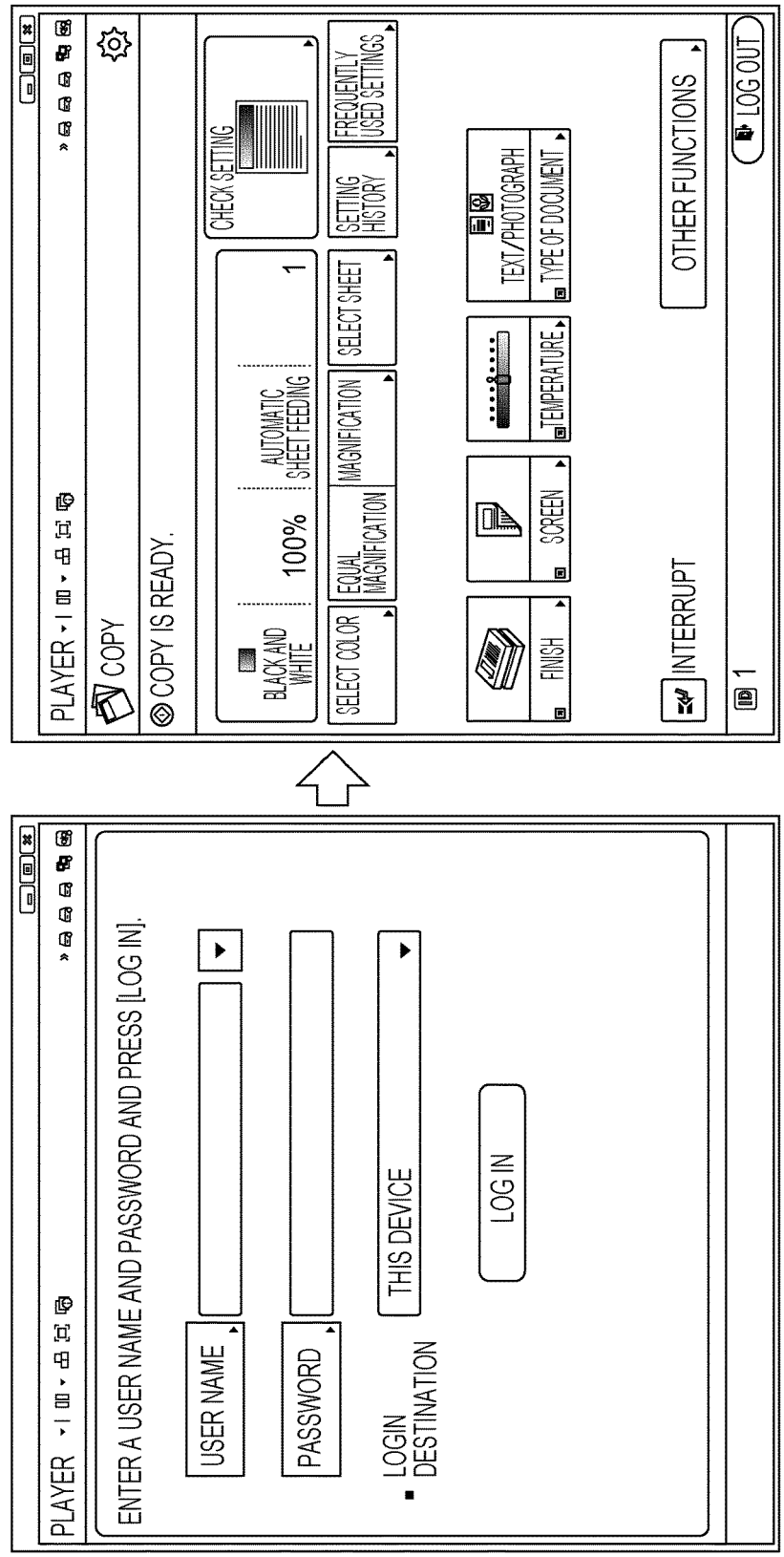

Screen color inversion setting information and an initial display screen will be described as another example with reference to FIG. 6B. It is assumed that the set value of screen color inversion setting information in shared setting information is "NOT-INVERTED" and that the set value of initial display screen information is "TOP MENU". It is assumed that the set value of the screen color inversion setting information for a user D is "INVERT" and that the set value of the initial-display-screen setting information is "COPY" (the corresponding copy function will be described below). In the example in FIG. 6B, the screen color is not inverted on the log-in screen 300 in a not-log-in state. When the user D executes a log-in process and the authentication succeeds, the set value of the screen color setting information for the user D and the set value of the initial-display-screen setting information are reflected in S315 in FIG. 4A. Thus, in the example in FIG. 6B, the screen color is set as "INVERT" in the log-in state. A screen first displayed after the log-in process is a "COPY" screen. When the user D logs out, the set value of the screen color inversion setting information in the shared setting information in S331 in FIG. 4B is reflected. Thus, the screen color of the log-in screen 300 is set as "NOT-INVERTED". Additionally, a user may customize, as personal setting information, keyboard setting information (keyboard layout setting information), key repeat setting information, voice setting information (voice-mode setting information), milli/inch switching setting information and so on. It should be noted that setting information held by other MFPs 101 may be customized.

According to this exemplary embodiment, the keyboard setting information (keyboard layout setting information) is information usable for changing a layout of a keyboard displayed on the touch panel 118. In other words, the layout of characters and symbols assigned to keys of the keyboard may be changed. For example, when the user A has a log-in state, the keyboard layout is set as "JAPANESE KEYBOARD ARRAY". When the user B has a log-in state, the keyboard layout is set as "CHINESE KEYBOARD ARRAY".

The key repeat setting information is information describing a time period until a shift to a long-press mode. The long-press mode may be acquired by pressing a button in a keyboard for a predetermined time period and may allow sequential input of one character or changing a shift lock, for example. For example, when the user A has a log-in state, the shift to the long-press mode is achieved in "1 second". When the user B has a log-in state, the shift to the long-press mode is achieved in "3 seconds".

Voice setting information (voice-mode setting information) refers to setting information for using a voice function. The voice function includes a voice key operation function and a voice speaking operation function. The voice key operation function is a function for informing a user of data required for an operation of the MFP 101 as a voice guidance. The voice key operation function outputs a voice guidance from a speaker through a voice control I/F. The voice speaking operation function is a function for analyzing a speech generated by a user and uses a recognized keyword to handle it as a user input, instead of operations on the touch panel 118. The voice speaking operation function analyzes a voice signal input by using a microphone through the voice control I/F in a voice analysis unit and may handles a recognized keyword as an input from a user. Setting examples of the voice function may include an ON/OFF setting for selecting whether the voice function is to be started or not upon log-in, a switch setting for male voice or female voice occurring for voice guidance, a volume setting for voice guidance, a speed setting for voice guidance, a time setting from start of speaking to voice analysis, and an ON/OFF setting for display of confirmation of execution during a speaking operation, for example. For example, when the user A has a log-in state, the voice settings may be "Start voice mode upon log-in", "Speed: Highest", "Female Voice", and "Volume: Maximum". When the user B has a log-in state, "Not start voice mode upon log-in" may be set.

The milli/inch switching setting information is information for switching the display unit between "milli" and "inch". For example, when the user A has a log-in state, "Milli display" may be set. When the user B has a log-in state, "Inch display" may be set.

Figure 7A:
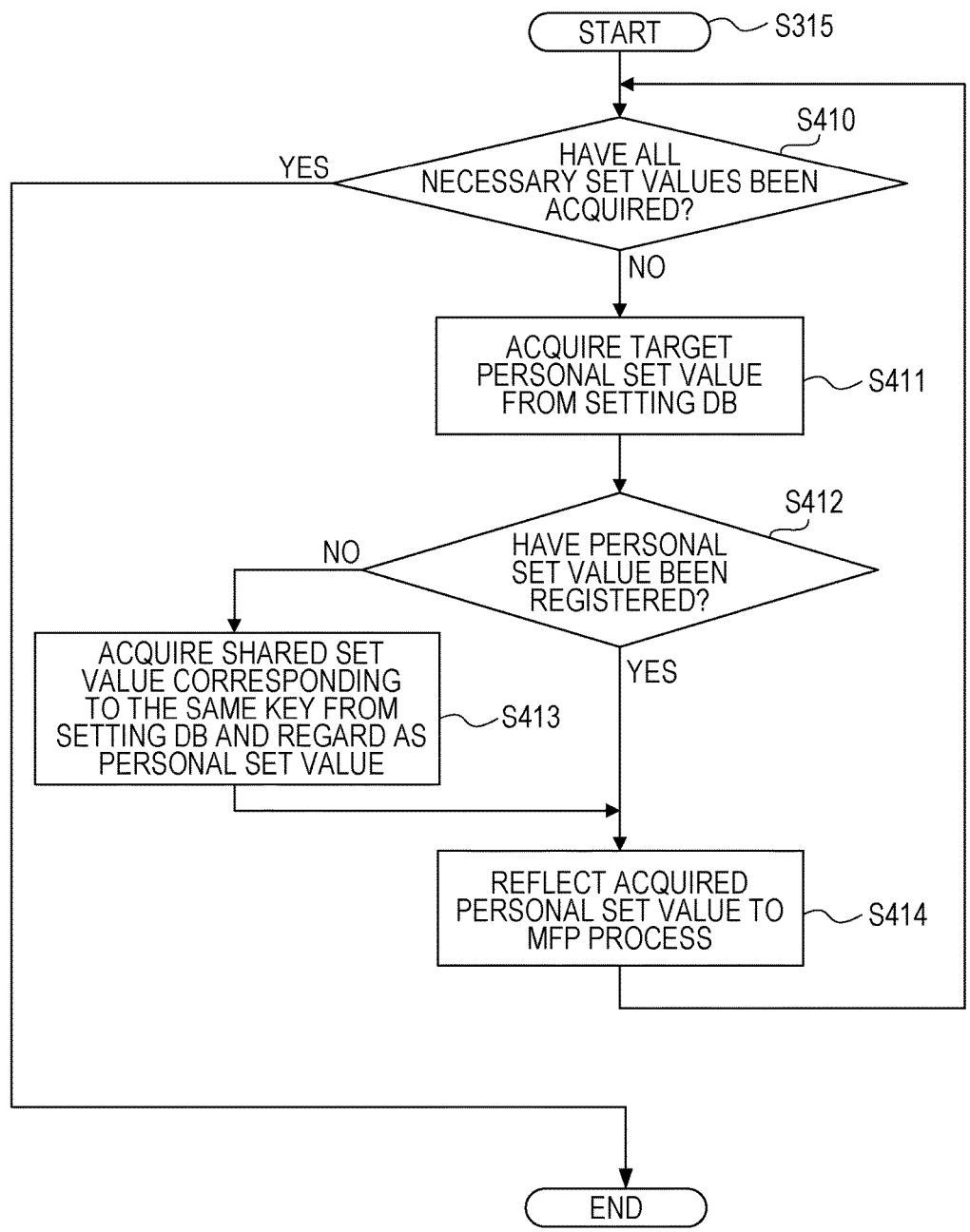
FIG. 7A is a flowchart illustrating an example of information processing which controls reflection of a personal set value.

FIG. 7A is a flowchart illustrating an example of information processing to be performed by the set-value storage control unit 203 which controls the reflection of a personal set value in S315 in FIG. 4A. As described above, the processing by the set-value storage control unit 203 may be implemented by execution of a program stored in the ROM 113 by the CPU 111. The set-value storage control unit 203 issues a request for execution of the following flow to a corresponding control unit. The set-value storage control unit 203 refers a setting key list of set values requiring the reflection upon log-in and judges whether all set values have been acquired for keys in the setting key list or not (S410). Here, the setting key list is stored in the setting DB 400. If some set value has not been acquired in S410, the set-value storage control unit 203 receives the user identifier 321 issued in S314 from the authentication control unit 202 and acquires a personal set value of the corresponding user from the setting DB 400 (S411). The set-value storage control unit 203 judges whether a personal set value is registered or not based on a result of the processing in S411 (S412). If a personal set value is not registered (No in S412), the set-value storage control unit 203 acquires a shared set value corresponding to the same key and handles it as a personal set value (S413). The set-value storage control unit 203 gives the acquired personal set value to the corresponding control unit and requests to change processing in the control unit (S414). Returning to S410, the set-value storage control unit 203 judges whether all settings for keys in the setting key list have been processed or not. If not, the processing in the flowchart illustrated in FIG. 7A ends.

Figure 4B:
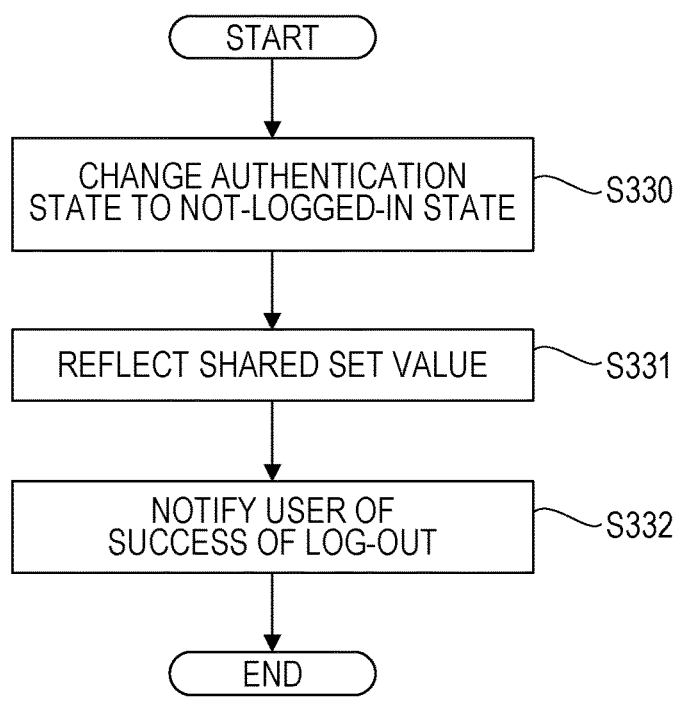
FIG. 4B is a flowchart illustrating an example of information processing to be performed when a user instructs to log out.
Figure 7B:
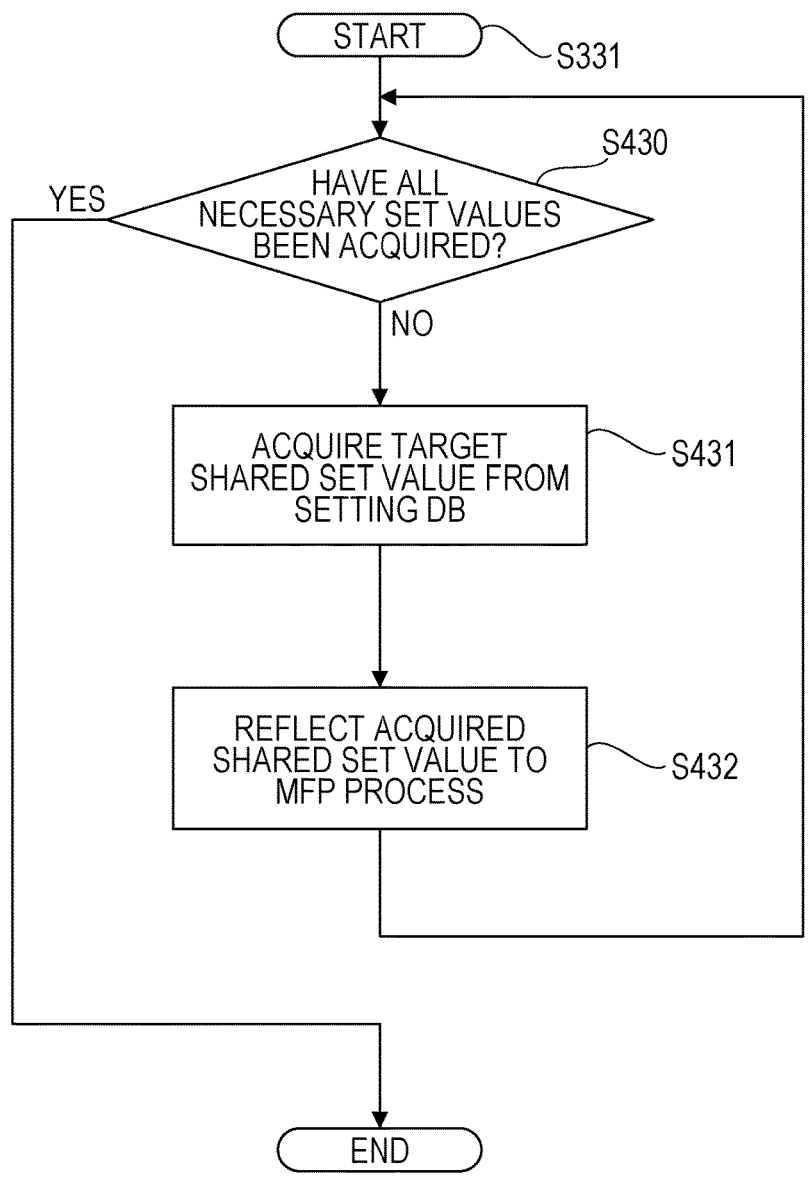
FIG. 7B is a flowchart illustrating an example of information processing which controls reflection of a shared set value.

FIG. 7B is a flowchart illustrating an example of information processing in the set-value storage control unit 203 which controls the reflection of a shared set value in S331 in FIG. 4B. The set-value storage control unit 203 issues a request for execution of the following flow to a corresponding control unit. The set-value storage control unit 203 refers the setting key list and judges whether all set values have been acquired (S430). If some set value has not been acquired in S430, the set-value storage control unit 203 acquires a shared set value from the setting DB 400 (S431). The set-value storage control unit 203 gives the acquired shared set value to the corresponding control unit and requests to change processing in the control unit (S432). Returning to S430, the set-value storage control unit 203 judges whether all of set values for keys in the setting key list have been processed. If so, the processing of the flowchart illustrated in FIG. 8 ends.

Figure 8:
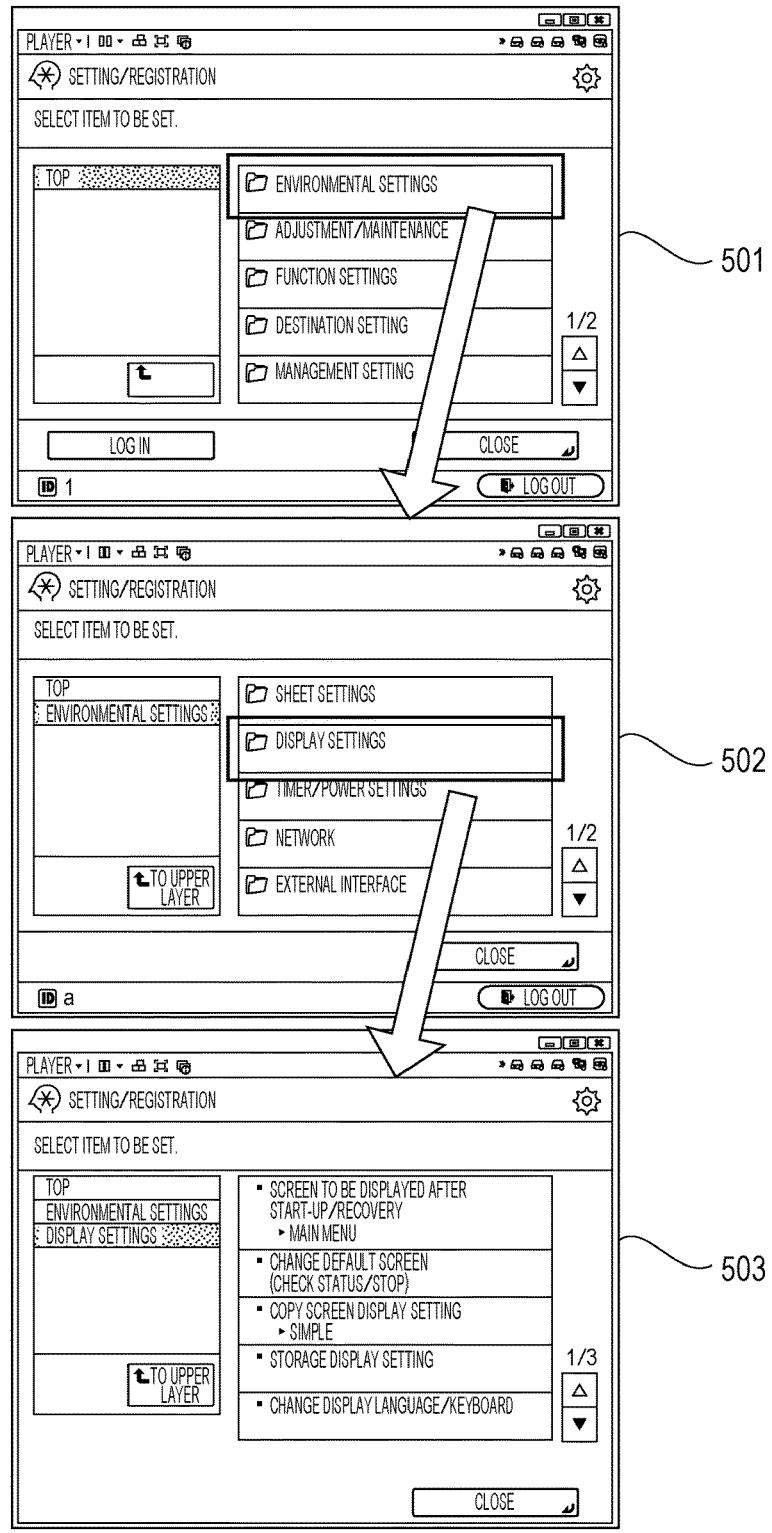
FIG. 8 illustrates a screen transition example.
Figure 9A:
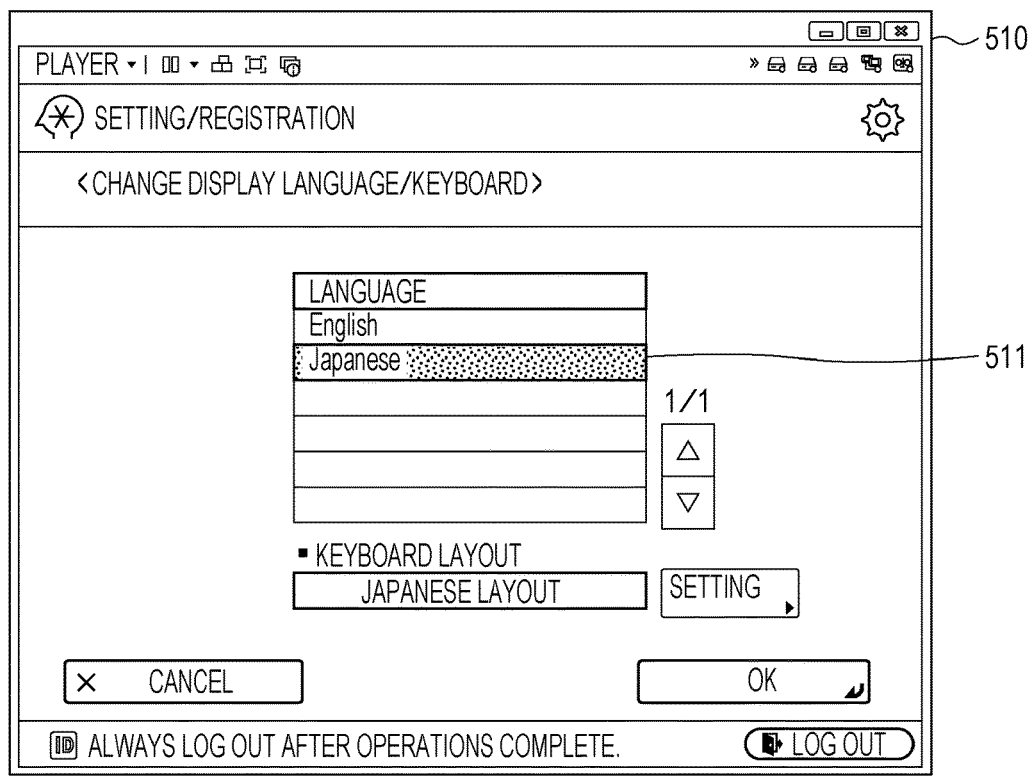
FIGS. 9A and 9B illustrate screen examples.

Next, the user-mode control unit 204 will be described. The user-mode control unit 204 has a function (hereinafter, called a user mode) for registering and changing a set value in shared setting information and personal setting information. The user-mode control unit 204 displays a setting changing screen for changing a shared set value on the display device 119. FIG. 8 illustrates an example of a user mode screen. The user mode screen represents setting information in a hierarchical structure. In a top hierarchy 501, when an "ENVIRONMENT SETTING" button is pressed, an environment setting change screen 502 is displayed. When a "DISPLAY SETTING" button is pressed, a display setting change screen 503 is displayed. When a "DISPLAY LANGUAGE" button is pressed on the display setting change screen 503, a display-language-setting change screen 510 is displayed on which a set value of display language information may be changed. In the screen example in FIG. 9A, a display-language-setting change screen 510 is displayed. On the display-language-setting change screen 510, a user may select an arbitrary language from a language selection list 511 and defines it as a set value of the display language information. When a user instructs to change a set value on a corresponding setting change screen (setting operation), the user-mode control unit 204 supplies the corresponding target shared setting information and set value to the set-value storage control unit 203. The set-value storage control unit 203 reflects the changed value to the setting DB 400.

Figure 9B:
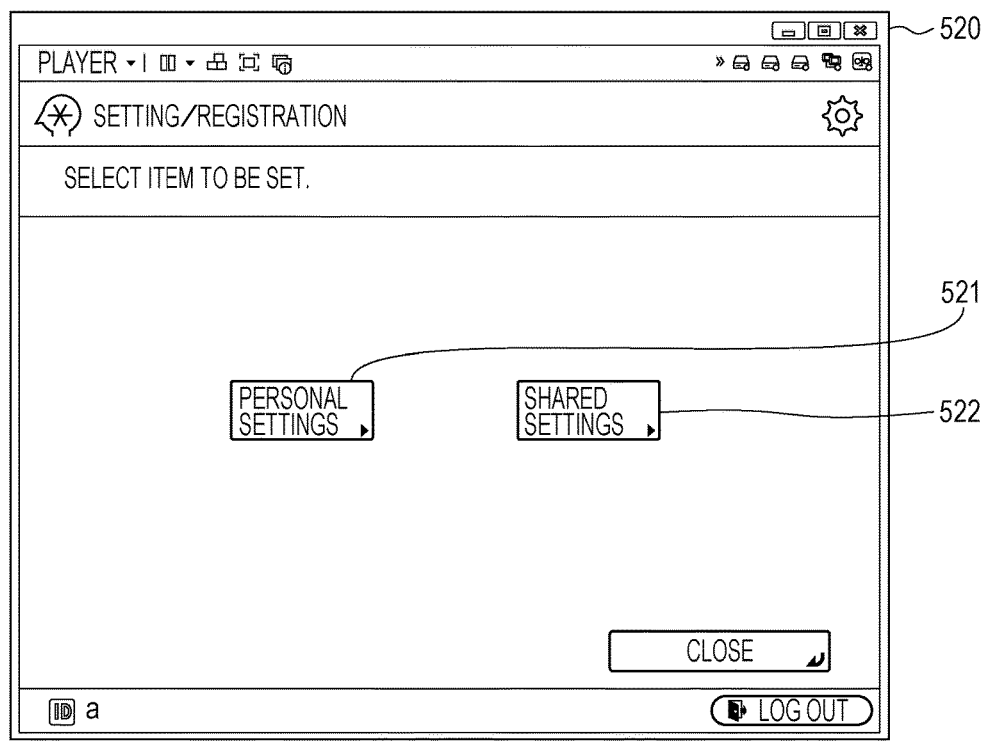

It may be configured to allow selection of change of shared setting information or change of personal setting information. FIG. 9B illustrates an example of a setting switching screen 520 which allows a user to select between change of personal setting information and change of shared setting information before a user mode screen is displayed. On the setting switching screen 520, when a user presses a personal setting selection button 521, personal setting information is selected. When a shared setting selection button 522 is pressed, shared setting information is selected. The setting items which may be changed in a user mode may include an item which may be defined by a user having a special authority. For example, a user having an administrator authority for the MFP 101 may be allowed to change setting information including both of shared setting information and personal setting information. A user having a general authority may be allowed to change his or her personal setting information only. It should be noted that a plurality of special authorities may be defined for the MFP 101.

Figure 10A:
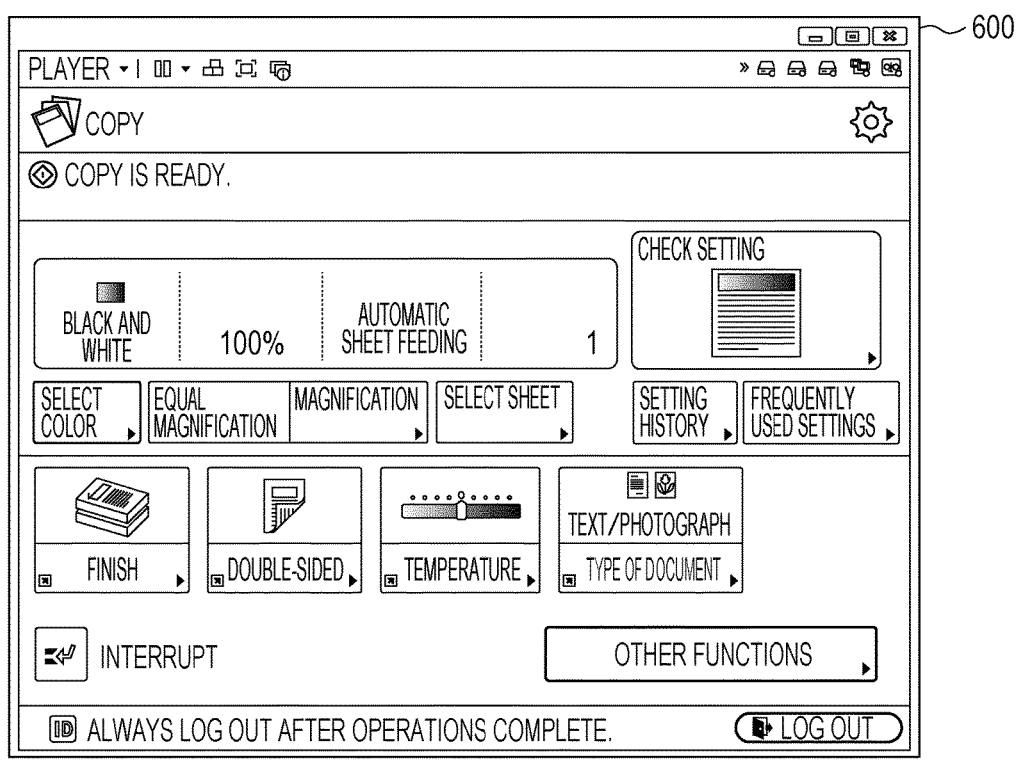
FIGS. 10A and 10B illustrate screen examples.

Next, the copy control unit 210 will be described. The copy control unit 210 may control a function for reading, copying and printing a paper document (hereinafter, called copy function). The copy control unit 210 may read image data from the scanner 121, causes an image processing control unit to perform an image process, for example, on the read image data, and output the image-processed image data to the printer 122. Examples of setting information for the copy function may include layout (Nin 1) setting information which designates N documents from which one copy image is to be generated and double-sided setting information which designates to read one-sided or double-sided document. Another example of the setting information for the copy function may include polychrome mode setting information which designates a color setting for printing such as full color and monochrome. An setting item for implementation of the copy function will be called job setting information. An initial value first set on a Copy job set screen 600 (FIG. 10A) on which job setting information for the copy function is to be designated will be called a default job set value. The user-mode control unit 204 in response to an instruction to register a default job set value on the Copy job setting screen 600 registers a set value with the setting DB 400. The registration instruction from a user may include information whether to register as a set value for shared setting information or to register as a set value for personal setting information.

When personal setting information is registered with the setting DB 400, the copy control unit 210 reads a default job set value of the personal setting information and displays it on the Copy job setting screen 600. When personal setting information is not registered with the setting DB 400, the copy control unit 210 reads a default job set value of the shared setting information and displays it on the Copy job setting screen 600. A user may set a default job set value for other Function instead of the copy function. The copy function also include a function (hereinafter, called a call function) for saving history of job setting information when a user execute the copy function and reading the job setting information saved in the history on the Copy job setting screen 600. The call function may save a plurality of job setting information sets, but a highest limit of the number of sets to be saved is set as 3 here, for example. The copy control unit 210 may store the last history, the second history from the last one, the third history from the last and job setting information in the setting DB 400 every time a user executes the copy function and deletes the history exceeding the higher limit.

Figure 10B:
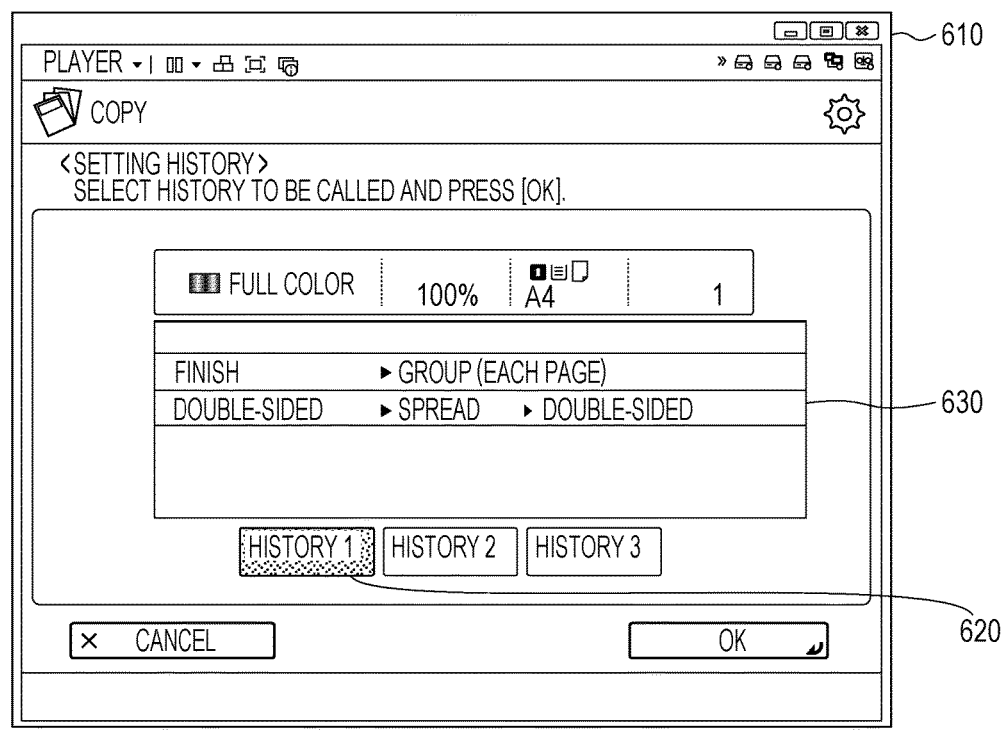

FIG. 10B illustrates an example of a call screen 610 for calling a history of job setting information. The call screen 610 may include a history designation button 620 and a job setting confirmation list 630. The history designation button

620 is a button usable by a user for designating which history from the last one to be called. In the example of FIG. 10B, the last history, the second history from the last one and the third history from the last one may be called by using "HISTORY 1", "HISTORY 2", and "HISTORY 3", respectively. The job setting confirmation list 630 displays data of a job setting information set for each history. In the example in FIG. 10B, the job setting information for "HISTORY 1" contains "FULL COLOR" as a set value of polychrome mode information, "100%" as a set value of scaling information "A4" as a set value of paper size information, and "1" as a set value of copy number information. The set value of finish information is "GROUP", and the set value of both-sided information is "SPREAD" and "DOUBLE-SIDED". When a user executes a copy function, for example, the copy control unit 210 stores a history of job setting information as shared setting information which may be referred by all users and stores a history of job setting information as personal setting information which may be referred by an applicable user only. The copy control unit 210 may store histories of both of shared setting information and personal setting information or may store either one in accordance with the mode. The MFP 101 may store a history of job setting information for other Functions without limiting to the copy function. The MFP 101 may store a history for each Function or a common history for all Functions.

Next, the transmission control unit 211 will be described. The transmission control unit 211 controls a function for reading a paper document and transmitting it to an external server (hereinafter, called a transmit function). The transmission control unit 211 reads image data from the scanner 121, causes an image processing control unit, for example, to perform an image process on the read image data, and generate a file having a predetermined file format. The predetermined file format may be JPEG (Joint Photographic Experts Group) or TIFF (Tagged Image File Format), for example. The transmission control unit 211 may transmit the generated file to a server or may be attached to an E-Mail for transmission, for example.

Figure 11A:
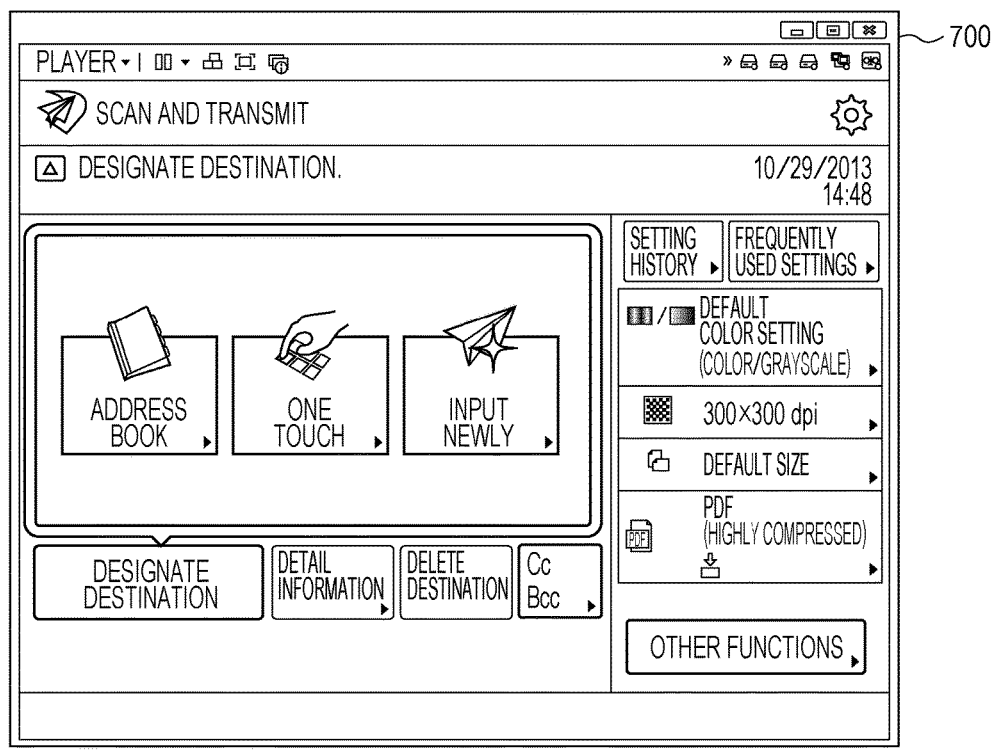
FIGS. 11A and 11B illustrate screen examples.

FIG. 11A illustrates an example of a transmit job setting screen 700. On the transmit job setting screen 700, a user may designate a destination or may designate a setting for reading. The transmit function has an address book function with which address information of a destination may be registered in advance. The address book information may be categorized into shared address book information, personal address book information, and group address book information in accordance with the usage. The shared address book information is information on an address book which may be shared by all users and may be stored as shared setting information within the setting DB 400. The personal address book information is information on an address book which may be used by an applicable user only and may be stored as personal setting information within the setting DB 400. The group address book information is information on an address book which may be used by a user belonging to an applicable group as group setting information within the setting DB 400. Each of the shared address book information, personal address book information, and group address book information has a plurality of address lists 720, and a plurality of address information sets may be registered with each of the address lists 720.

Figure 11B:
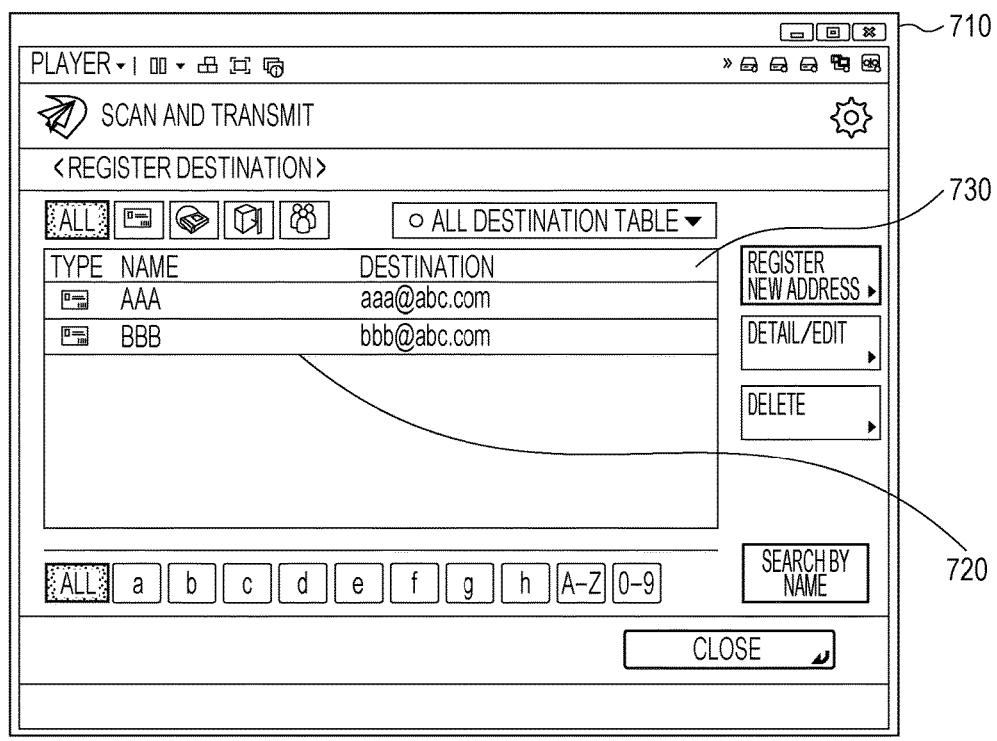

FIG. 11B illustrates an example of an address book screen 710. The address book screen 710 includes an address list 720 and an address list selection button 730. The address list 720 displays a list of address information sets registered with the address list 720. The address list selection button 730 may display pull-down menus of address list names in a shared address book, a personal address book, and a group address book and displays the address list 720 designated by a user.

Next, the custom-menu control unit 212 will be described. The custom-menu control unit 212 controls a function for storing set values for other Functions and registering them customizable buttons (hereinafter, custom menu function). A user may set another Function and instruct a button registration therefor. Thus, the custom-menu control unit 212 registers a shortcut button to the Function set on a custom menu screen. For example, it is assumed that a user defines an E-Mail address "aaa@abcd.co.jp" as a transmit setting and a color mode of "FULL COLOR" and a resolution of "200 dpi" for reading on a transmission screen controlled by the transmission control unit 211. After a user instructs to register the shortcut button, the custom-menu control unit 212 newly registers a shortcut button for the settings. In the process for registering a shortcut button, a user may change the name of a button such as "client/Mr. aaa", for example. When a user presses a button corresponding to "client/Mr. aaa" on the custom menu screen, the custom-menu control unit 212 reads the registered set values and requests the transmission control unit 211 to display the transmission screen based on the read set values.

The custom menu function may be classified into a shared button, a personal button, and a group button in accordance with the usage (refer to the button list switching button 810, which will be described below, in FIGS. 12A and 12B). The shared button is a shortcut button which allows all users to share setting information and is usable for storing setting information as shared setting information within the setting DB 400. The personal button is a shortcut button which allows an applicable user only to use setting information and is usable for storing setting information as personal setting information within the setting DB 400. The group button is a shortcut button which allows a user belonging to an applicable group to use setting information and is usable for storing setting information as group setting information within the setting DB 400. A plurality of shortcut buttons may be registered with each of the shared button, personal button, and group button. A user may select one of the button list switching buttons 810 (selection operation), for example, to instruct to store as personal setting information or store as shared setting information.

Figure 12A:
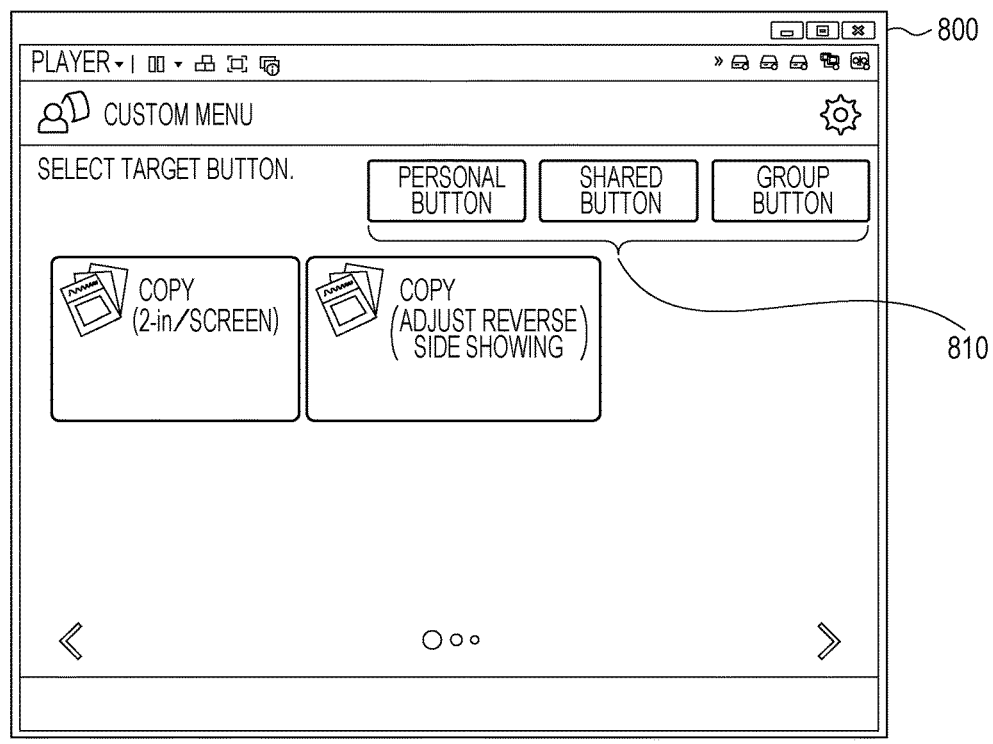
FIGS. 12A and 12B illustrate screen examples.
Figure 12B:
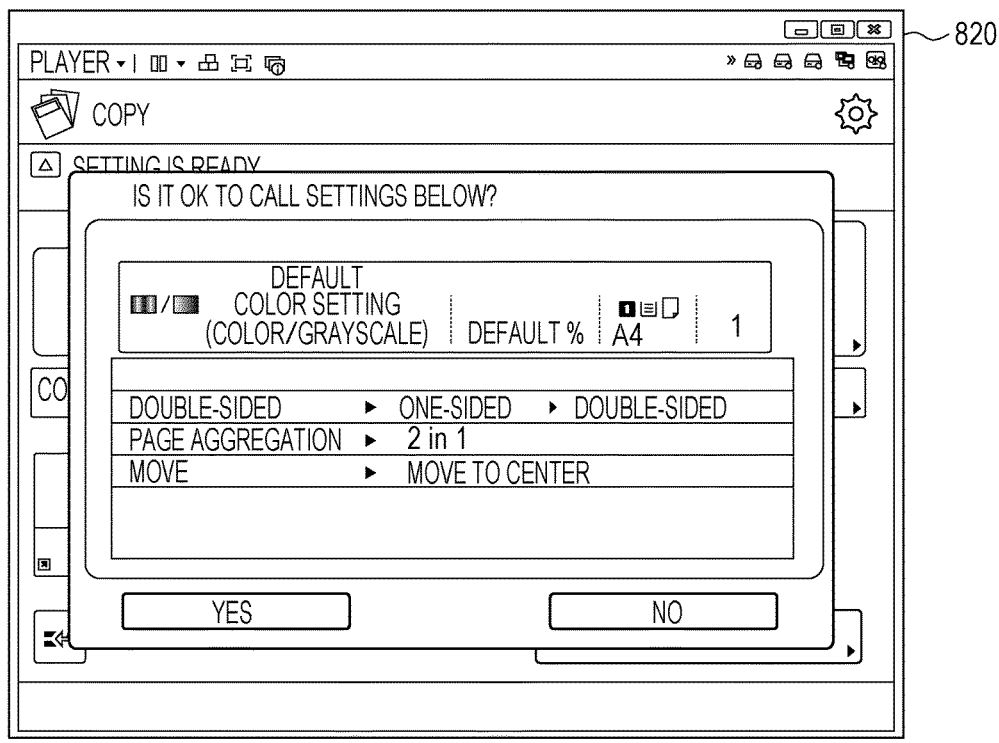

FIG. 12A illustrates a screen example of the custom menu screen 800. In the example in FIG. 12A, two buttons registered with the copy function are displayed. For example, when a user presses a "COPY (2IN1/DOUBLE-SIDED)" button, a setting confirmation dialog 820 illustrated in FIG. 12B is displayed. When a user confirms the job set values as intended ones, for example, and selects "YES", the custom-menu control unit 212 requests a control unit corresponding to the desired Function so as to execute the process based on the registered job set values. In the example in FIG. 12B, the copy control unit 210 controls a copy process by using the following job setting information. That is, the set value of the color mode information is "AUTOMATIC", the set value of the magnification information is "AUTOMATIC", the set value of the paper size information is "A4", the set value of the copy number information is "1", the set value of the both-sided information is "ONE-SIDED→DOUBLE-SIDED", and the set value of page aggregation information is "2in1", and the set value of the displacement information is "MOVE TO CENTER".

Second Exemplary Embodiment

According to a second exemplary embodiment, a configuration will be described in which setting information is synchronized between MFPs.

Figure 13:
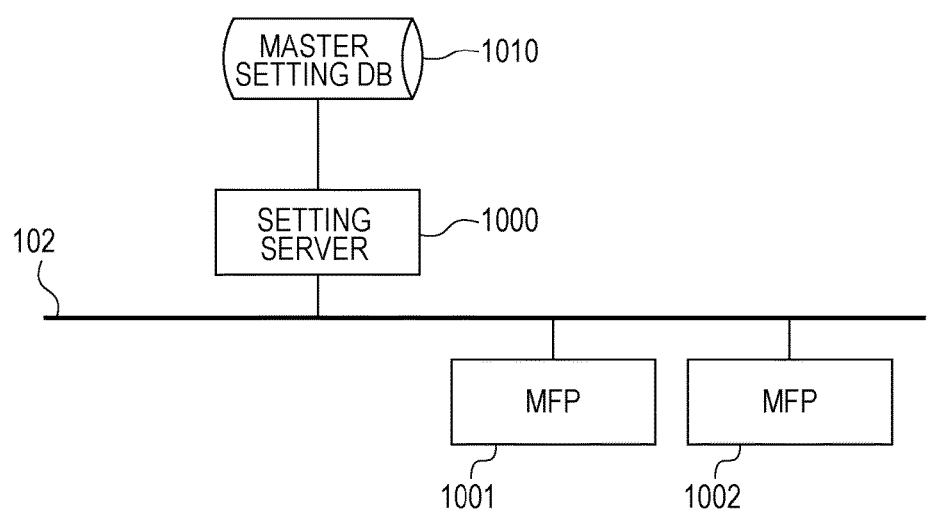
FIG. 13 illustrates an example of a system configuration.

FIG. 13 illustrates an example of a system configuration of an image-forming system. As illustrated in FIG. 13, the image-forming system has a setting server 1000, an MFP 1001 and an MFP 1002 connected communicably through a network 102. Here, functions of the setting server 1000 may also be included in the MFP 1001 or the MFP 1002. For example, in a case where the MFP 1001 has a function of the setting server 1000, the MFP 1001 is a master MFP and manages setting information for another MFP.

The setting server 1000 includes at least a CPU, a memory, and a network I/F device as hardware components. The CPU may execute a process based on a program stored in the memory to implement a function of the setting server 1000 and a process in the setting server 1000 in a flow which will be described below. The memory in the setting server 1000 stores shared setting information, personal setting information and group setting information contained in a master setting DB 1010. The master setting DB 1010 may contain personal setting information only. The hardware configurations of the MFP 1001 and the MFP 1002 may be the same as that of the MFP 101 according to the first exemplary embodiment. The software configurations of the MFP 1001 and MFP 1002 will be described below.

In the example in FIG. 13, the MFP 1001 and the MFP 1002 are connected to the setting server 1000 through the network 102. When a user changes setting information in the MFP 1001, the changed setting information is notified to the setting server 1000. The MFP 1002 inquires the setting server 1000 of whether a change of setting information has occurred or not. If a change of setting information has occurred, the setting information relating to the change is acquired by the setting server 1000. Thus, a detail of the setting change in the MFP 1001 is reflected to setting information in the MFP 1002.

The software configurations of the MFP 1001 and MFP 1002 according to the second exemplary embodiment will be described with reference to FIG. 14.

Figure 14:
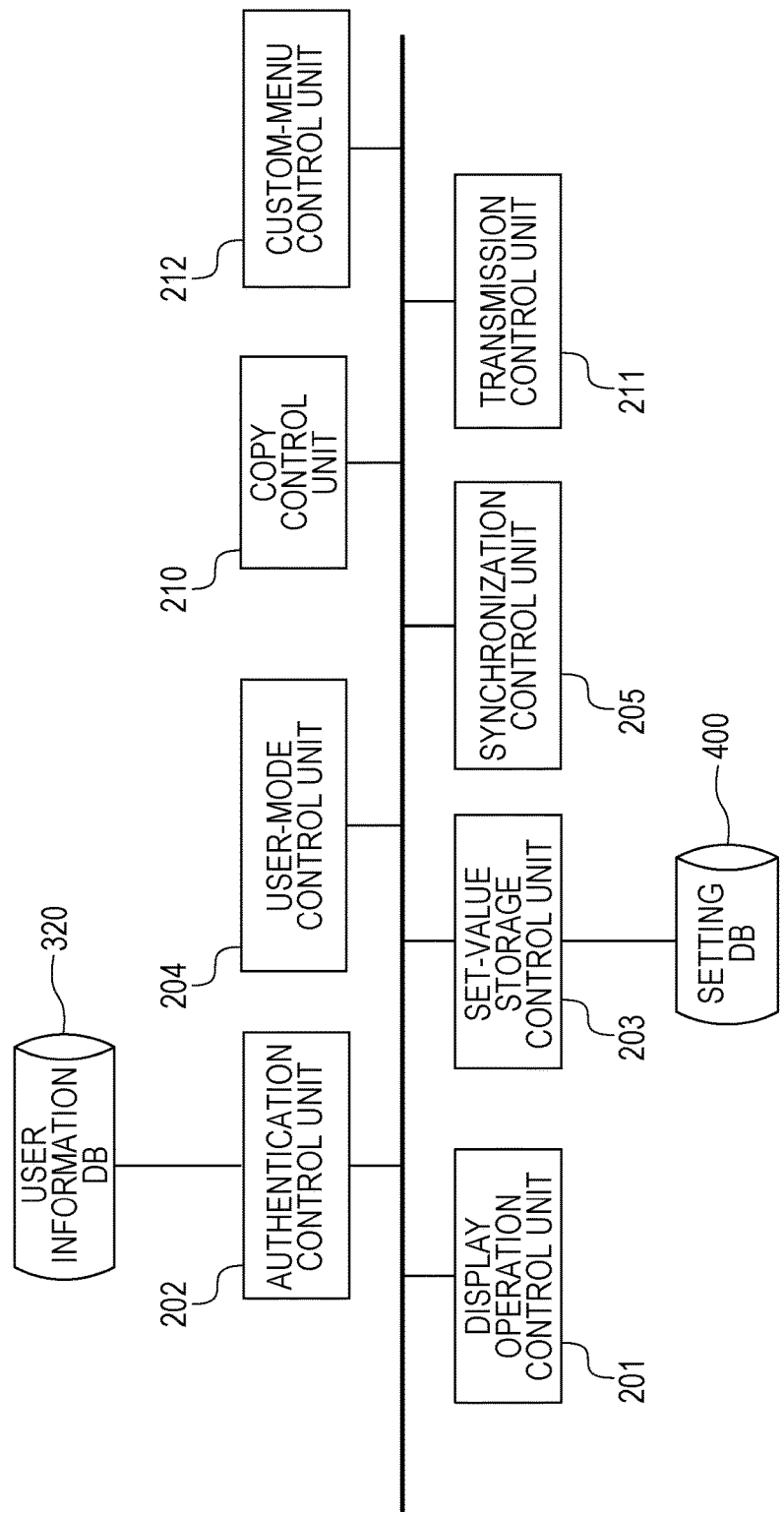
FIG. 14 illustrates an example of a software configuration of an MFP according to a second exemplary embodiment.

The display operation control unit 201, authentication control unit 202, set-value storage control unit 203, user-mode control unit 204, copy control unit 210, transmission control unit 211, and custom-menu control unit 212 in FIG. 14 are equivalent to those of the first exemplary embodiment. The synchronization control unit 205 communicates with the setting server 1000 through the communication I/F controller 117 to control for synchronization between setting information stored in the setting DB 400 and setting information stored in the master setting DB 1010 on the setting server 1000.

Next, processing for synchronization with the setting server 1000 in a case where setting information in the MFP 1001 is changed will be described with reference to FIG. 15. Changes of setting information may include registration, editing, and deletion of setting information. A change of setting information may be executed by the user-mode control unit 204 based on a user instruction. Instead of the user-mode control unit 204, the copy control unit 210, the transmission control unit 211, the custom-menu control unit 212, or other Function control unit may change setting information.

The user-mode control unit 204 in response to an instruction from a user requests the set-value storage control unit 203 to change setting information (S1100). The set-value storage control unit 203 updates the setting DB 400 (S1101). If a setting change fails in S1101, the user-mode control unit 204 notifies a user of that the setting change fails (S1103). If the setting change succeeds in S1101, the set-value storage control unit 203 requests the synchronization control unit 205 to notify a detail of a setting change to the setting server 1000. The synchronization control unit 205 notifies the detail of the setting change to the setting server 1000 through the network 102 in response to the request (S1104). If the communication with the setting server 1000 fails, the set-value storage control unit 203 retries the process in S1104 a predetermined number of times or for a predetermined time period. If the communication with the setting server 1000 succeeds in S1104, the setting server 1000 reflects a detail of the notified setting change to the master setting DB 1010 (S1107). The setting server 1000 transmits the communication result (information describing that the setting change has succeeded) to the MFP 1001. When receiving the information, the user-mode control unit 204 notifies a user of that the setting change has succeeded (S1108).

Next, the processing in the MFP 1002 for synchronizing the setting change detail in the MFP 1001 with the setting server 1000 will be described with reference to FIG. 16.

The set-value storage control unit 203 requests the synchronization control unit 205 to start a synchronization process, and the synchronization control unit 205 notifies a last synchronization time to the setting server 1000 and requests setting information of a difference as a result of the setting change after the last synchronization time (S1111). The last synchronization time is an example of time information of the last synchronization. The request is an example of the acquisition request. The MFP holds the time when the last synchronization has been performed in advance in the external memory 120 and notifies the time as the last synchronization time to the setting server 1000. In S1111, if the communication with the setting server 1000 has failed, the synchronization control unit 205 judges whether a retry is possible or not. If so, the processing returns to S1111. If a retry is not possible, the MFP 1002 ends the processing. The setting server 1000 acquires setting information of a difference caused by a setting change at and after the notified last synchronization time notification (in and after the time period) (S1113). The setting server 1000 then transmits the acquired setting information of the difference to the MFP 1001. When receiving the setting information of the difference from the setting server 1000, the synchronization control unit 205 supplies the setting information of the difference to the set-value storage control unit 203. Then, the set-value storage control unit 203 reflects the setting information of the difference to the setting DB 400 (S1115). If the reflection of setting information results in an error, the set-value storage control unit 203 retries a predetermined number of times or for a predetermined time period.

It is assumed here that the synchronization control unit 205 starts the timing for executing the flowchart in FIG. 16 in response to the authentication upon log-in, for example. However, the start timing, for example, may be changed in accordance with a setting for the start time such as upon log-in, upon log-out, at a designated time, after a lapse of a predetermined time period, and on a designated date and time. The synchronization of shared setting information, synchronization of personal setting information, and synchronization of group setting information may be started in different timings from each other. The synchronization start timing may be changed for a specific setting information only.

A configuration may be possible in which the setting server 1000 side manages setting-information synchronization times with MFPs, setting-information update times and so on while the MFPs may only request a difference in setting information to the setting server 1000. Alternatively, the synchronization control unit 205 may judge whether an MFP has cached setting information or not. If so, the synchronization control unit 205 may transmit the last synchronization time to the setting server 1000 as described above and thus acquire a difference in setting information. On the other hand, if the setting information is not cached, the synchronization control unit 205 may, without transmitting the last synchronization time, request the setting server 1000 to all of the latest setting information, acquire all of the latest setting information from the setting server 1000 and reflect them to MFPs.

Others Exemplary Embodiments

The present invention may be implemented by processing including supplying a program which implements one or more functions of the aforementioned exemplary embodiments to a system or an apparatus over a network or a through a storage medium and causing one or more processors in a computer in the system or apparatus to read and execute the program. Alternatively, the present invention may be implemented by a circuit (such as an ASIC) which implements one or more of the functions.

The aforementioned exemplary embodiments may provide a technology in which, when a user logs in, a personal set value of the user may be reflected and, when a user logs out, shared setting value may be reflected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-051875 filed Mar. 14, 2014, which is hereby incorporated by reference herein in its entirety.

What is claimed is:

1. An image-forming apparatus comprising:
a display;
a memory that stores, as personal setting information, screen color inversion information indicating whether or not a screen color is to be color-inversed, in association with user identification information for identifying a user who uses the image forming apparatus, and stores, as device setting information, the screen color inversion information indicating whether or not the screen color is to be color-inversed; and
at least one processor, wherein the at least one processor executes:
a log-in task for performing a log-in processing for causing a user to log in to the image forming apparatus;
a display control task for, in accordance with a log-in of the user to the image forming apparatus, displaying, on the display, an operation screen using the screen color inversion information stored in association with the user identification information for identifying the log-in user; and
a log-out task for performing a log-out processing for causing the user to log out from the image forming apparatus,
wherein, in accordance with a log-out of the user from the image forming apparatus, the display control task displays, on the display, an operation screen on a basis of the screen color inversion information stored in the memory as the device setting information.

2. The image-forming apparatus according to claim 1, wherein the first operation screen displayed by the display control task is a menu screen for selecting a function of the image-forming apparatus.

3. The image-forming apparatus according to claim 1, wherein the at least one processor executes:
another display control task for displaying, on the display, a registration screen for registering the screen color inversion information, and
a storage control task for storing, in accordance with a registration operation by the user via the registration screen, the screen color inversion information in the memory in association with the user identification information.

4. The image-forming apparatus according to claim 1, wherein the memory stores, as the personal setting information, keyboard layout setting information indicating a layout of a keyboard displayed on the display in association with the user-identification information,
wherein the at least one processor executes:
a reflecting task for, in accordance with the log-in of the user to the image forming apparatus, reflecting the keyboard layout setting information stored in association with the user-identification information for identifying the log-in user.

5. The image-forming apparatus according to claim 1, wherein the memory stores, as the personal setting information, voice-mode setting information for utilizing a voice function in association with the user-identification information,
wherein the at least one processor executes:
a reflecting task for, in accordance with the log-in of the user to the image forming apparatus, reflecting the voice-mode setting information stored in association with the user-identification information for identifying the log-in user.

6. The image-forming apparatus according to claim 1, wherein the memory stores, as device setting information, screen color inversion information indicating whether or not the screen color is to be color-inversed,
wherein the at least one processor executes:
a log-out task for performing a log-out processing for causing the user who has logged in to the image forming apparatus to log out; and
another display control task for, in accordance with a log-out of the log-in-user from the image forming apparatus, displaying, on the display, a second operation screen using the screen color inversion information stored as the device setting information.

7. The image-forming apparatus according to claim 6, wherein the first display control task displays the first operation screen using the screen color inversion information stored as the device setting information, in a case where the screen color inversion information is not stored in the memory in association with the user identification information for identifying the log-in user.

8. The image-forming apparatus according to claim 1, further comprising a transmitting unit configured to transmit a change detail to a server apparatus which is communicable over a network when the personal setting information is changed.

9. The image-forming apparatus according to claim 8, further comprising:
an acquiring unit configured to acquire a difference in the personal setting information from the server apparatus; and
a reflecting unit configured to reflect the difference acquired by the acquiring unit to the personal setting information.

10. The image-forming apparatus according to claim 9, wherein the acquiring unit transmits to the server apparatus a request to acquire a difference in the personal setting information including time information regarding a last synchronization and acquires from the server apparatus a difference in personal setting information changed in another image-forming apparatus after a time described in the time information.

11. The image-forming apparatus according to claim 9, wherein the acquiring unit acquires a difference in the personal setting information from the server apparatus in accordance with a log-in of a user.

12. A control method for controlling an image-forming apparatus that includes a display and a memory that stores, as personal setting information, screen color inversion information indicating whether or not a screen color is to be color-inversed, in association with user identification information for identifying a user who uses the image forming apparatus, and stores, as device setting information, the screen color inversion information indicating whether or not the screen color is to be color-inversed, the method comprising:
performing, by at least one processor, a log-in processing for causing a user to log in to the image forming apparatus;
in accordance with a log-in of the user to the image forming apparatus, displaying, by the display, an operation screen using the screen color inversion information stored in association with the user identification information for identifying the log-in user; and
a log-out task for performing a log-out processing for causing the user to log out from the image forming apparatus,
wherein, in accordance with a log-out of the user from the image forming apparatus, the display control task displays, on the display, an operation screen on a basis of the screen color inversion information stored in the memory as the device setting information.

13. A non-transitory storage medium which stores a program comprising instructions that, when executed by a computer of an image-forming apparatus that includes a display and a memory that stores, as personal setting information, screen color inversion information indicating whether or not a screen color is to be color-inversed, in association with user identification information for identifying a user who uses the image forming apparatus, and stores, as device setting information, the screen color inversion information indicating whether or not the screen color is to be color-inversed, cause the computer to perform operations comprising:
performing a log-in processing for causing a user to log in to the image forming apparatus;
in accordance with a log-in of the user to the image forming apparatus, displaying, on the display, an operation screen using the screen color inversion information stored in association with the user identification information for identifying the log-in user; and
a log-out task for performing a log-out processing for causing the user to log out from the image forming apparatus,
wherein, in accordance with a log-out of the user from the image forming apparatus, the display control task displays, on the display, an operation screen on a basis of the screen color inversion information stored in the memory as the device setting information.

14. The image-forming apparatus according to claim 1, wherein the memory is capable of storing, as the personal setting information, initial display screen information indicating a first-displayed screen after completion of log-in, in association with the user identification information, and
wherein the first operation screen is displayed based on the initial display screen information stored in the memory in association with the user identification information of the log-in user.

15. The image-forming apparatus according to claim 6, wherein the second operation screen is a log-in screen for inputting information used for a user to log in.

16. The image-forming apparatus according to claim 6, further comprising a selection unit that selects whether the screen color inversion information is to be registered as the personal setting information or to be registered as the device setting information.

17. The image-forming apparatus according to claim 1, wherein the memory stores, as the personal setting information, key repeat setting information indicating a time period until a shift to a long-press mode, in association with the user-identification information,
wherein the at least one processor executes:
a reflecting task for, in accordance with the log-in of the user to the image forming apparatus, reflecting the key repeat setting information stored in association with the user-identification information for identifying the log-in user.

* * * * *